US012100162B2

(12) United States Patent
Li et al.

(10) Patent No.: US 12,100,162 B2
(45) Date of Patent: Sep. 24, 2024

(54) METHOD AND SYSTEM FOR OBTAINING AND PROCESSING FOREGROUND IMAGE AND BACKGROUND IMAGE

(71) Applicant: ZHEJIANG DAHUA TECHNOLOGY CO., LTD., Zhejiang (CN)

(72) Inventors: Qiankun Li, Hangzhou (CN); Qing Guo, Hangzhou (CN); Wei Lu, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 569 days.

(21) Appl. No.: 17/336,348

(22) Filed: Jun. 2, 2021

(65) Prior Publication Data
US 2021/0295529 A1  Sep. 23, 2021

Related U.S. Application Data

(63) Continuation of application No. PCT/CN2019/099748, filed on Aug. 8, 2019.

(30) Foreign Application Priority Data

Dec. 3, 2018  (CN) .......................... 201811464365.4

(51) Int. Cl.
  *G06T 7/60*  (2017.01)
  *G06T 7/136*  (2017.01)
  (Continued)

(52) U.S. Cl.
  CPC .............. *G06T 7/194* (2017.01); *G06T 7/136* (2017.01); *G06T 7/174* (2017.01);
  (Continued)

(58) Field of Classification Search
  CPC ..................................................... G06T 7/194
  See application file for complete search history.

(56) References Cited

U.S. PATENT DOCUMENTS 9,965,865 B1    5/2018  Agrawal et al.
10,467,479 B2 * 11/2019 Kawano ................. H04N 5/272
(Continued)

FOREIGN PATENT DOCUMENTS

CN    101320427 A    12/2008
CN    101640809 A     2/2010
(Continued)

OTHER PUBLICATIONS

The Extended European Search Report in European Application No. 19894330.0 mailed on Dec. 2, 2021. 9 pages.
(Continued)

*Primary Examiner* — Brian Werner
(74) *Attorney, Agent, or Firm* — METIS IP LLC

(57) ABSTRACT

A method and system for image processing are provided in the present disclosure. The method may include obtaining a first image and determining whether there is an object of interest in the first image by performing an object detection on the first image. The method may also include upon a determination that there is an object of interest in the first image, retrieving at least one background image from a first storage device, and obtaining a foreground image. The method may further include upon a determination that there is no object of interest in the first image, determining whether a first predetermined condition is satisfied; and upon a determination that the first predetermined condition is satisfied, updating the at least one background image in the first storage device based on at least one candidate image determined as including no object of interest.

15 Claims, 10 Drawing Sheets

(51) Int. Cl.
  *G06T 7/174* (2017.01)
  *G06T 7/194* (2017.01)
(52) U.S. Cl.
  CPC .............. *G06T 2207/10016* (2013.01); *G06T 2207/10024* (2013.01); *G06T 2207/10028* (2013.01); *G06T 2207/20224* (2013.01); *G06T 2207/30232* (2013.01)

(56) References Cited

U.S. PATENT DOCUMENTS

| | | | |
|---|---|---|---|
| 2004/0151342 A1* | 8/2004 | Venetianer | G06T 7/143 |
| | | | 382/199 |
| 2007/0279494 A1 | 12/2007 | Aman et al. | |
| 2009/0016603 A1* | 1/2009 | Rossato | G06T 7/12 |
| | | | 382/173 |
| 2010/0027842 A1 | 2/2010 | Guo et al. | |
| 2011/0243383 A1* | 10/2011 | Oyaizu | G06T 7/248 |
| | | | 382/103 |
| 2015/0054974 A1 | 2/2015 | Ehmann | |
| 2015/0371398 A1 | 12/2015 | Qiao et al. | |
| 2018/0077376 A1 | 3/2018 | Armeni et al. | |

FOREIGN PATENT DOCUMENTS

| | | |
|---|---|---|
| CN | 102055982 B | 6/2012 |
| CN | 103177456 A | 6/2013 |
| CN | 103209321 A | 7/2013 |
| CN | 103369342 A | 10/2013 |
| CN | 104700405 A | 6/2015 |
| CN | 104952054 A | 9/2015 |
| CN | 105608479 A | 5/2016 |
| CN | 106251348 A | 12/2016 |
| CN | 108280842 A | 7/2018 |
| WO | 2020113989 A1 | 6/2020 |

OTHER PUBLICATIONS

International Search Report in PCT/CN2019/099748 mailed on Oct. 31, 2019, 4 pages.
Written Opinion in PCT/CN2019/099748 mailed on Oct. 31, 2019, 5 pages.
First Office Action in Chinese Application No. 201811464365.4 mailed on May 9, 2020, 13 pages.

* cited by examiner

METHOD AND SYSTEM FOR OBTAINING AND PROCESSING FOREGROUND IMAGE AND BACKGROUND IMAGE

CROSS-REFERENCE TO RELATED APPLICATIONS

This application is a continuation of International Patent Application No. PCT/CN2019/099748, filed on Aug. 8, 2019, which claims priority to Chinese Patent Application No. 201811464365.4, filed on Dec. 3, 2018, the contents of each of which are hereby incorporated by reference.

TECHNICAL FIELD

The present disclosure generally relates to a method and system for image processing, and particularly relates to a method and system for background filtering.

BACKGROUND

Background filtering, which may also be referred to as foreground detection or background subtraction, is a commonly used technique for extracting an object of interest from an image of a shooting scene. During the background filtering, a background image (or a background model) is obtained using one or more pre-obtained frames of a video (or image sequence). With such a background image, by performing one or more specific operations such as a frame differencing operation on a current frame, a moving object, which may have a great chance to be an object of interest, may be obtained and extracted.

Currently, when obtaining or updating a background image (or model) for background filtering, a situation that an object of interest keeps in still in the shooting scene for a long time is usually out of consideration. Consequently, such a long-time-still object may be taken as the background, and may fail to be accurately and completely extracted from the video (or image sequence).

Therefore, it is desirable to provide a method and system for performing a background filtering with enhanced performance toward a long-time-still object of interest.

SUMMARY

According to an aspect of the present disclosure, a system for image processing is provided. The system may include at least one storage medium including a set of instructions, and at least one processor in communication with the at least one storage medium. When executing the set of instructions, the at least one processor may be directed to obtain a first image, and determine whether there is an object of interest in the first image by performing an object detection on the first image. Upon a determination that there is an object of interest in the first image, the at least one processor may be further directed to retrieve at least one background image from a first storage device, and obtain a foreground image based at least in part on the first image and the at least one background image. Upon a determination that there is no object of interest in the first image, the at least one processor may be directed to determine whether a first predetermined condition is satisfied, and update the at least one background image in the first storage device based on at least one candidate image determined as including no object of interest upon a determination that the first predetermined condition is satisfied.

In some embodiments, to update the at least one background image, the at least one processor may be directed to retrieve the at least one candidate image from a second storage device, and update the at least one background image in the first storage device based on the at least one candidate image, wherein the at least one candidate image is updatable. Upon the determination that there is no object of interest in the first image, the at least one processor may be directed further to determine whether a second predetermined condition is satisfied, and update the at least one candidate image in the second storage device based at least in part on the first image upon a determination that the second predetermined condition is satisfied.

In some embodiments, the at least one processor may be further directed to update a condition parameter upon the determination that there is no object of interest in the first image, reset the condition parameter upon the determination that there is an object of interest in the first image, and reset the condition parameter upon the determination that a first predetermined condition is satisfied, wherein the first predetermined condition and the second predetermined condition are based on the condition parameter.

In some embodiments, the first image may be associated with at least one reference image. The first image and the at least one reference image may respectively represent different aspects of substantially a same shooting scene. The foreground image may be further obtained based on the at least one reference image.

In some embodiments, the first image may be generated via a first sensor of an image capturing mechanism. One of the at least one reference image may be generated via a second sensor of the image capturing mechanism, or be generated based at least in part on a second image generated by the second sensor.

In some embodiments, the at least one background image may include a first background image corresponding to the first image. The at least one background image may include a second background image corresponding to each of the at least one reference image, thereby including at least one second background image.

In some embodiments, to obtain the foreground image based at least in part on the first image and the at least one background image, the at least one processor may be directed to obtain a difference image based on the first image, the at least one reference image, the first background image, and the at least one second background image, wherein the difference image includes one or more difference image regions, each of the one or more difference image regions represents a difference between a corresponding image region of the first image and a corresponding image region of the first background image, or a difference between a corresponding image region of one of the at least one reference image and a corresponding image region of the corresponding second background image. The at least one processor may be further directed to for each pixel of the one or more difference image regions, determine whether the pixel be a foreground pixel or a background pixel based on one or more pixel values of the pixel and one or more corresponding thresholds. The at least one processor may be also directed to generate the foreground image based at least in part on the foreground pixels of the one or more difference image regions.

In some embodiments, the first image includes one or more detection regions obtained by performing the object detection on the first image, and the one or more difference image regions correspond to the one or more detection regions.

In some embodiments, to generate the foreground image based at least in part on the foreground pixels of the one or more difference image regions, the at least one processor may be directed to for each of the one or more difference image regions, when a number of the foreground pixels in the difference image region is more than a predetermined threshold, generate a corresponding portion of the foreground image using the foreground pixels in the difference image region threshold. For each of the one or more difference image regions, the at least one processor may be directed to when a number of the foreground pixels in the difference image region is equal to or less than the predetermined threshold, determine that the difference image region includes no object of interest, and skip generating a corresponding portion of the foreground image using the foreground pixels in the difference image region.

In some embodiments, the at least one processor may be further directed to trigger the determination whether the first predetermined condition is satisfied when each of the one or more difference image regions is determined as including no object of interest.

In some embodiments, the first image, the at least one reference image, and the at least one background image form a plurality of image sets. To obtain the one or more difference image regions, the at least one processor may be directed to, for each of the one or more difference image regions, select a target image set from the plurality of image sets and generate the difference image region based on the target image set.

In some embodiments, the at least one processor may be further directed to for each of the one or more difference image regions, retrieve a first image region corresponding to the difference image region from the first image. The at least one processor may be also directed to, for each of the one or more difference image regions, retrieve a second image region corresponding to the difference image region from each of the at least one reference image, thereby obtaining at least one second image region, wherein the selecting the target image set from the plurality of image sets may be based at least in part on one or more features of the first image region and the at least one second image region for each of the one or more difference image regions.

In some embodiments, to select the target image set from the plurality of image sets, the at least one second image region may be configured to determine whether a third predetermined condition is satisfied, wherein the third predetermined condition may be correlated to the one or more features of the first image region and the at least one second image region. The at least one processor may be further directed to select the target image set based on a result of the determination.

In some embodiments, the first image may be a color image. The at least one reference image may include a depth image. The at least one background image may include a color background image and a depth background image corresponding to the color image and the depth image respectively. The third predetermined condition includes at least one of that: a ratio of a number of valid pixels in the second image region of the depth image to a number of pixels in the second image region of the depth image may be more than a first threshold; a mean of pixel values of the pixels in the second image region of the depth image may be more than a second threshold; or a ratio of a number of pixels in the first image region of the color image whose gradient value may be more than a third threshold to a number of pixels in the first image region of the color image may be more than a fourth threshold.

In some embodiments, the color image and the color background image may form a first image set. The depth image and the depth background image may form a second image set. To select the target image set based on the result of the determination, the at least one processor may be directed to select the second image set as the target image set upon a determination that the third predetermined condition is satisfied, and select the first image set as the target image set upon a determination that the third predetermined condition is not satisfied.

According to another aspect of the present disclosure, a system for image processing is provided. The system may include at least one storage medium including a set of instructions, and at least one processor in communication with the at least one storage medium. When executing the set of instructions, the at least one processor may be directed to obtain a first image and at least one reference image, wherein the first image and the at least one reference image represent different aspects of substantially a same shooting scene. The at least one processor may be further directed to obtain a plurality of background images, wherein the plurality of background images includes a first background image corresponding to the first image, and at least one second image corresponding to the at least one reference image. The at least one processor may be also directed to generate a difference image based on the first image, the at least one reference image, and the plurality of background images, wherein the difference image includes one or more difference image regions, each of which represent a difference between a corresponding image region of the first image and a corresponding image region of the first background image, or a difference between a corresponding image region of one of the at least one reference image and a corresponding image region of the corresponding second background image. The at least one processor may be further directed to and obtain a foreground image based on the first image and the difference image.

According to another aspect of the present disclosure, a method for image processing is provided. The method may include obtaining a first image, and determining whether there is an object of interest in the first image by performing an object detection on the first image. Upon a determination that there is an object of interest in the first image, the method may further include retrieving at least one background image from a first storage device, and obtaining a foreground image based at least in part on the first image and the at least one background image. Upon a determination that there is no object of interest in the first image, the method may also include determining whether a first predetermined condition is satisfied, and upon a determination that the first predetermined condition is satisfied, updating the at least one background image in the first storage device based on at least one candidate image determined as including no object of interest.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
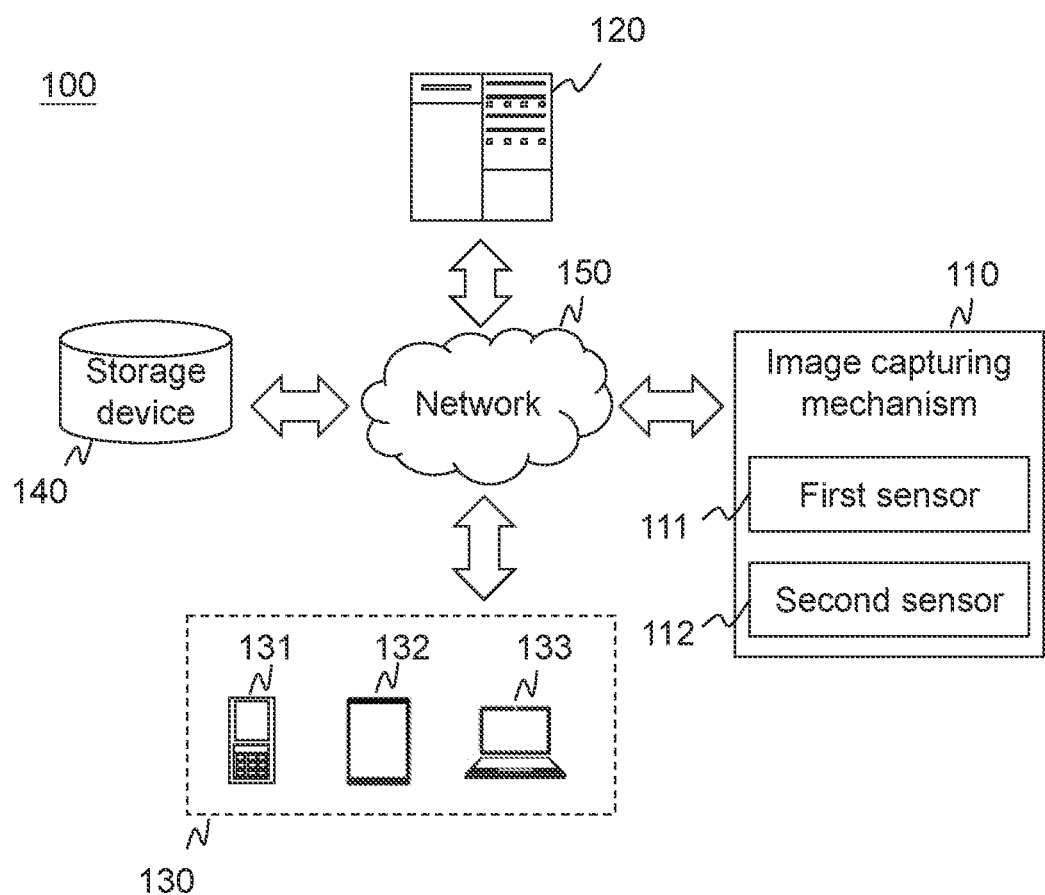
FIG. 1 is a schematic diagram illustrating an exemplary image processing system according to some embodiments of the present disclosure.

The present disclosure is directed to a method and system for performing a background filtering on an image (or a frame of a video), so as to obtain a foreground image including at least one object of interest. The background image(s) for performing the background filtering may be generated or updated only based on one or more images determined as including no object of interest, so as to improve the performance of the background filtering toward long-time-still objects of interest. In some embodiments, the background filtering can be performed based on different aspects of the shooting scene. For example, a plurality of background images may be associated with the background filtering. The plurality of background images may correspond to different aspect of the shooting scene, and can be selectively used for performing the background filtering on different regions of the image, thereby improving the overall background filtering performance.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 2:
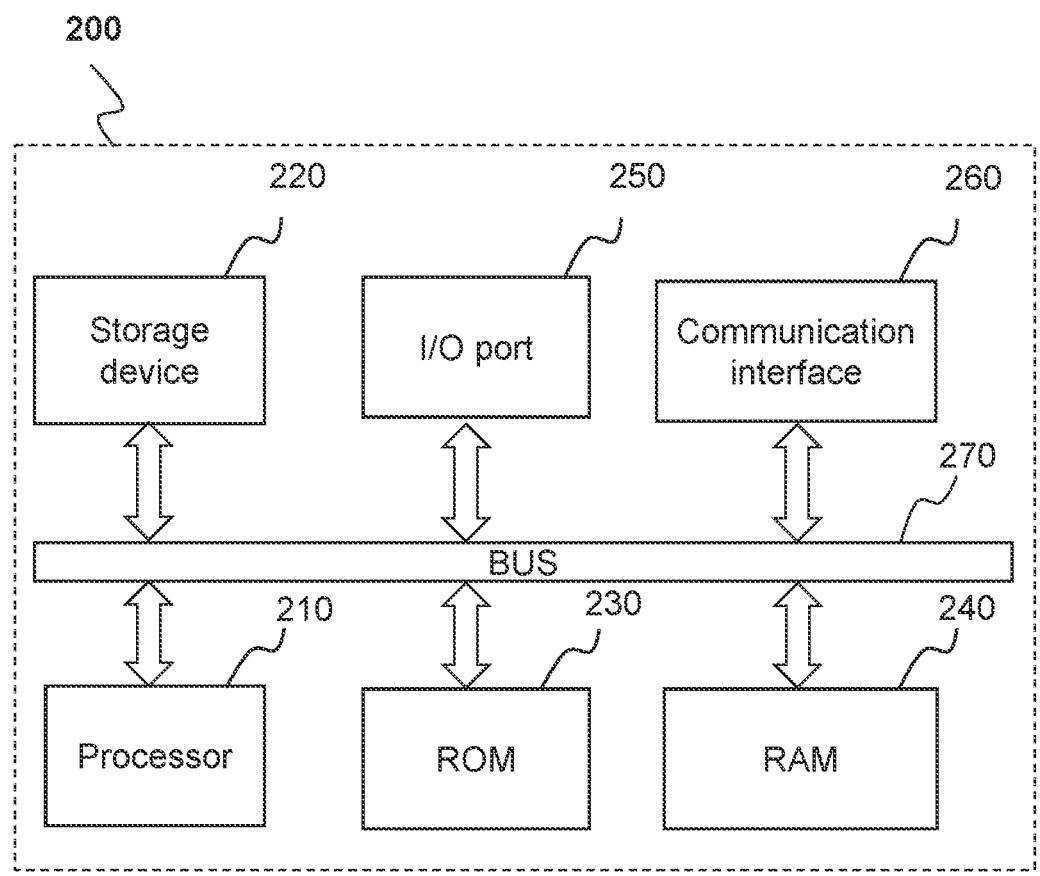
FIG. 2 illustrates an exemplary computing device for implementing one or more components of the image processing system illustrated in FIG. 1.

Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

FIG. 1 is a schematic diagram illustrating an exemplary image processing system 100 according to some embodiments of the present disclosure. The image processing system 100 may include an image capturing mechanism 110, an image processing device 120, a terminal device 130, a storage device 140, and a network 150.

The image capturing mechanism 110 may be configured to obtain a first image. As used herein, an image may be a photo, a video, a frame of a video, a picture, a spectrum, or the like, or a combination thereof. The image may be of or presented in an analog form (e.g., an electric signal carrying the image data) or a digital form (e.g., a digital file including the image data). The image capturing mechanism 110 may sense light, waves, radiations, etc., to generate corresponding images. The type of the first image may be based on the configuration of the image capturing mechanism 110. For example, when the image capturing mechanism 110 includes a normal image sensor (e.g., a charge-coupled device (CCD) sensor, a complementary metal-oxide-semiconductor (CMOS) sensor) equipped with a color filter array (CFA) for generating the first image, the first image may be a color image. When the image includes a thermal image sensor such as a focal plane array (FPA) sensor for generating the first image, the first image may be a thermogram. It is noted that the type of the first image is not limited in the present disclosure.

The first image generated by the image capturing mechanism may be transmitted to the image processing device 120 for further processing, or be temporary stored in the storage device 140.

In some embodiments, the image processing system 100 may be applied in the surveillance field. The image capturing mechanism 110 may be mounted in a room, in a hallway, in a parking lot, in a street, in a park, in an elevator, in a vehicle, etc., for capturing a surveillance video. The first image may be a frame of the surveillance video.

The image processing device 120 may be configured to obtain the first image from the image processing device 120 or the storage device 140, and generate a foreground image based at least in part on the first image and at least one background image. The foreground image may be the foreground portion of the first image identified by the image processing device 120, which may represent one or more objects of interest in the shooting scene. In some embodiments, the first image may be a frame of a video. The image processing device 120 may process another frame of the video using the same process for processing the first image or a different process to generate a corresponding foreground image.

In some embodiments, the image processing device 120 may obtain the foreground image using a background filtering based approach. In such an approach, the image processing device 120 may obtain the foreground image according to the difference between the first image and a corresponding background image. The first image and the background image may be images of the same shooting scene, and may have substantially the same size and/or shape. One or more image regions (or pixels) of the first image that are determined as sufficiently different from the corresponding image portions (or pixels) of the background image may be extracted (e.g., copied, segmented) from the first image. The extracted image region(s) may form the foreground image. In some embodiments, both of the first image and the background image may be obtained by the image capturing mechanism 110. For example, the first image may be a frame of a video captured by the image capturing mechanism 110, and the background image may be or be generated based on one or more frames of the same video.

The background image for the background filtering may be obtained or updated based on at least one image of the shooting scene that is determined, by the image processing device 120, as including no object of interest. In some embodiments, the at least one image, and the first image, may be frames of the same video. In a traditional background filtering approach, however, the background image may be obtained or updated without the above determination. For example, the background image may be a preceding frame of the video, or a mean of multiple preceding frames, no matter whether the preceding frame(s) includes an object of interest or not. However, such an approach may not have a good performance in some specific situations. For example, an object of interest may keep in still in the shooting scene for a long time. Such an object of interest may be referred to as a long-time-still object, and may have limited difference between different frames. With a traditional background filtering approach, the long-time-still object of interest may have limited difference between the first image and the background image. Consequently, the long-time-still object may fail to be completely extracted from the first image. In the present disclosure, however, as the background image is obtained or updated based on one or more images including no object of interest, a long-time-still object of interest in the shooting scene may be included in the first image but not included in the background image. Therefore, the long-time-still object of interest can be completely extracted from the first image as at least a part of the foreground image.

In some embodiments, to further improve the performance of the background filtering, the image processing device 120 may generate the foreground image based further on at least one reference image. The at least one reference image may be associated with the first image. The first image and the at least one reference image may represent different aspects of substantially the same shooting scene, such as color, luminance, distance (or depth), temperature, radiation strength, etc. In some specific embodiments, the first image may be a color image representing color information and/or luminance information of a shooting scene A, and the at least one reference image may include a depth image representing depth (or distance) information of the shooting scene A (or a shooting scene B which is mostly overlapped (e.g., over 80%) with the shooting scene A). For example, pixels of the color image may represent color and/or luminance information of corresponding points of the shooting scene A, and pixels of the depth image may represent distances between corresponding points of the shooting scene A (or shooting scene B) and a reference point associated with the image capturing mechanism 110. Correspondingly, the at least one background image for performing the background filtering may also include multiple background images of the different aspects, which may correspond to the first image and the at last one reference image. For example, when the first image is a color image and the at least one reference image includes a depth image, the at least one background image may include a color background image and a depth background image corresponding to the color image and the depth image.

Detailed descriptions of the image processing device 120, the generation of the foreground image, and the updating of the background image are provided elsewhere in the present disclosure.

In some embodiments, the image capturing mechanism 110 may including multiple sensors. For example, as shown in FIG. 1, the image capturing mechanism 110 may include a first sensor 111 configured to generate the first image, and a second sensor 112 configured to generate a second image. One of the at least one reference image may be the second image, or be generated based at least in part on the second image. For example, when the first image is a color image, and the second image is a depth image, the first sensor 111 may be a normal image sensor (e.g., a CCD sensor or a CMOS sensor) and the second sensor 112 may be a radar or lidar. Alternatively, both the first sensor 111 and the second sensor 112 may be normal image sensors. For example, the image capturing mechanism may be a binocular camera or a multi-camera system. The image processing device 120, or the image capturing mechanism 110, may generate the depth image based on the first image and the second image via, e.g., a stereo triangulation technique.

In some embodiments, the at least one reference image may include multiple reference images. The image capturing mechanism 110 may further include one or more additional image sensors, so as to generate the multiple reference images and the first image. For example, when the first image is a color image, and the at least one reference image includes a depth image and an infrared image, the image capturing mechanism 110 may further include an infrared image sensor (not shown) for generating the infrared image. Alternatively or additionally, at least a part of the multiple reference images may be obtained via another apparatus (not shown) of the image processing system 100 other than the image capturing mechanism 110.

The terminal device 130 may receive images or videos from the image capturing mechanism 110, the image processing device 120, and/or the storage device 140 via the network 150. In some embodiments, the terminal device 130 may also provide a user interface for a user to control the image processing device 120 and/or the image capturing mechanism 110. The terminal device 130 may include a mobile computing device 131, a tablet computer 132, a laptop computer 133, a smart home device (not shown), a desktop computer (now shown) or the like, or any combination thereof. In some embodiments, the mobile computing device 131 may include a wearable device, a mobile phone, a virtual reality device, an augmented reality device, a personal digital assistance (PDA), a navigation device, or the like, or any combination thereof.

The storage device 140 may store data, instructions, and/or any other information. In some embodiments, the storage device 140 may store data obtained from the image capturing mechanism 110, the image processing device 120, the terminal device 130, and any other device included in the image processing system 100 not shown in FIG. 1. For example, the storage device 140 may store data and/or instructions that the image processing device 120 may execute or use to perform exemplary methods described in the present disclosure. The storage device 140 may include a mass storage device, a removable storage device, a volatile read-and-write memory, a read-only memory (ROM), or the like, or any combination thereof. In some embodiments, the storage device 140 may be implemented on a cloud platform.

The image capturing mechanism 110, the image processing device 120, the terminal device 130, and the storage device 140 may communicate data and/or information via one or more cables and/or the network 150. The network 150 may include any suitable network that can facilitate the exchange of information and/or data for the image processing system 100. The network 150 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the image processing system 100 may be connected to the network 150 to exchange data and/or information.

It should be noted that the above description about the image processing system 100 is only for illustration purposes, and is not intended to limit the present disclosure. It is understandable that after learning the major concept and the mechanism of the present disclosure, a person of ordinary skill in the art may alter the image processing system 100 in an uncreative manner. The alteration may include combining and/or splitting modules or sub-modules, adding or removing optional modules or sub-modules, etc. For example, the image processing device 120, the terminal device 130, and/or the storage device 140 may be integrated into the image capturing mechanism 110. As another example, the terminal device 130 and/or the storage device 140 may be integrated into the image processing device 120. All such modifications are within the protection range of the present disclosure.

FIG. 2 illustrates an exemplary computing device for implementing one or more components of the image processing system 100 (e.g., the image processing device 120, the terminal device 130) illustrated in FIG. 1. For example, the computing device 200 may be configured to perform one or more operations disclosed in the present disclosure. The computing device 200 may include a bus 270, a processor 210, a read-only memory (ROM) 230, a random-access memory (RAM) 240, a storage 220 (e.g., massive storage device such as a hard disk, an optical disk, a solid-state disk, a memory card, etc.), an input/output (I/O) port 250, and a communication interface 260. It is noted that the architecture of the computing device 200 illustrated in FIG. 2 is only for demonstration purposes, and not intended to be limiting.

In some embodiments, the computing device 200 may be a single device. Alternatively, the computing device 200 may include a plurality of computing devices having the same or similar architectures as illustrated in FIG. 2, and one or more components of the computing device 200 may be implemented by one or more of the plurality of computing devices.

The bus 270 may couple various components of computing device 200 and facilitate transferring of data and/or information between them. The bus 270 may have any bus structure in the art. For example, the bus 270 may be or may include a memory bus and/or a peripheral bus.

The I/O port 250 may allow a transferring of data and/or information between the bus 270 and a peripheral device (e.g., components of the image processing system 100 such as the image capturing mechanism 110). For example, the I/O port 250 may include a universal serial bus (USB) port, a communication (COM) port, a PS/2 port, a high-definition multimedia interface (HDMI) port, a video graphics array (VGA) port, a video cable socket such as an RCA sockets and a Mini-DIN socket, or the like, or a combination thereof.

The communication interface 260 may allow a transferring of data and/or information between the network 150 and the bus 270. For example, the communication interface 260 may be or may include a network interface card (NIC), a Bluetooth™ module, an NFC module, etc.

The ROM 230, the RAM 240, and/or the storage 220 may be configured to store computer readable instructions that can be executed by the processor 210. The RAM 240, and/or the storage 220 may store data and/or information obtained from a peripheral device (e.g., the image capturing mechanism 110) and/or the network 150. The RAM 240, and/or the storage 220 may also store data and/or information generated by the processor 210 during the execution of the instruction. In some embodiments, the ROM 230, the RAM 240, and/or the storage 220 may be or may include the storage 130 illustrated in FIG. 1.

The processor 210 may be or include any processor in the art configured to execute instructions stored in the ROM 230, the RAM 240, and/or the storage device 220, so as to perform one or more operations or implement one or more modules/units disclosed in the present disclosure. Merely by way of example, the processor 210 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the computing device 200 may include a plurality of processors 210. The plurality of processors 210 may operate in parallel for performing one or more operations disclosed in the present disclosure.

In some embodiments, one or more of the components of the computing device 200 may be implemented on a single chip. For example, the processor 210, the ROM 230, and the RAM 240 may be integrated into a single chip.

In some embodiments, the computing device 200 may be a single device or include a plurality of computing devices having a same or similar architecture as illustrated in FIG. 2. In some embodiments, the computing device 200 may implement a personal computer (PC) or any other type of work station or terminal device. The computing device 200 may also act as a server if appropriately programmed.

Figure 3:
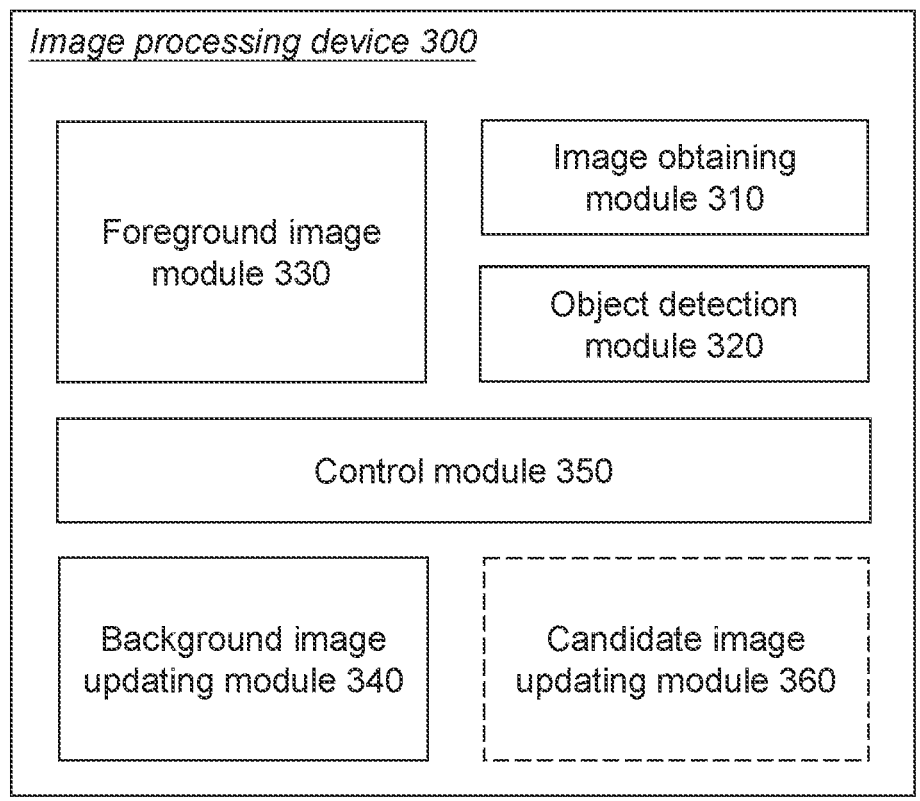
FIG. 3 is a schematic diagram illustrating an exemplary image processing device according to some embodiments of the present disclosure.

FIG. 3 is a schematic diagram illustrating an exemplary image processing device 300 according to some embodiments of the present disclosure. The image processing device 300 may be an example of the image processing device 120 illustrated in FIG. 1. The image processing device 300 may include an image obtaining module 310, an object detection module 320, a foreground image module 330, a background image updating module 340, a control module 350, and a candidate image updating module 360 (optional).

The image obtaining module 310 may be configured to obtain a first image. The first image may be an image to be processed by the image processing device 300. In some embodiments, the first image may be a frame of a video file or a video stream captured by, e.g., the image capturing mechanism 110. In some embodiments, the image obtaining module 310 may further obtain at least one reference image. The first image and the at least one reference image may represent different aspects of substantially the same shooting scene.

The object detection module 320 may be configured to detect one or more objects of interest in the first image by performing an object detection on the first image. The one or more objects of interest may include a single class of object (e.g., a human being class) or include multiple classes of objects (e.g., a human being class and a vehicle class).

The foreground image module 330 may be configured to retrieve at least one background image from a first storage device, and obtain a foreground image based at least in part on the first image and the at least one background image. The foreground image may include at least a part of the object(s) of interest detected by the object detection module 320. The at least one background image may be updatable. In some embodiments, the foreground image module 330 may generate the foreground image further based on the at least one reference image retrieved by the image obtaining module 310. In some embodiments, the at least one background image may include multiple background images corresponding to the first image and the at least one reference image.

An embodiment of the foreground image module 330 is also described in connection with FIG. 8.

The background image updating module 340 may be configured to update the at least one background image stored in the first storage device. When the at least one background image stored in the first storage device is updated, any foreground generation operation to be performed by the foreground image module 330 may be based on the updated background image(s).

The control module 350 may be configured to control the other modules of the image processing device 300. For example, the control module 350 may determine whether a predetermined condition is satisfied, and cause, based on the determination result, a corresponding module of the image processing device 300 to operate accordingly.

In some embodiments, the background image updating module 340 may be configured to retrieve at least one candidate image from a second storage device, and update the at least one background image based on the at least one candidate image.

In some embodiments, the image processing device 300 may further include a candidate image updating module 360 configured to update the candidate image based at least in part on the first image. In some specific embodiments, the candidate image may be configured to update the candidate image further based on the at least one reference image obtained by the image obtaining module 310. It is noted that the candidate image updating module 360 is not necessary, and may be removed in some embodiments of the present disclosure. The image processing device 300 (or the background image updating module 340) may only retrieve the at least one candidate image from the second storage device, and not be configured to generate or update the at least one candidate image.

The functions and operations of the modules of the image processing device 300 may be further described in connection with FIGS. 4 to 11.

It is noted that the above descriptions about the image processing device 300 are only for illustration purposes, and not intended to limit the present disclosure. It is understood that after learning the major concept and the mechanism of the present disclosure, a person of ordinary skill in the art may alter the image processing device 300 in an uncreative manner. The alteration may include combining and/or splitting modules, adding or removing optional modules, etc. The division of the modules of the image processing device 300 is merely based on a logical delineation. Other division formats may also be adopted. All such modifications are within the protection scope of the present disclosure.

Figure 4:
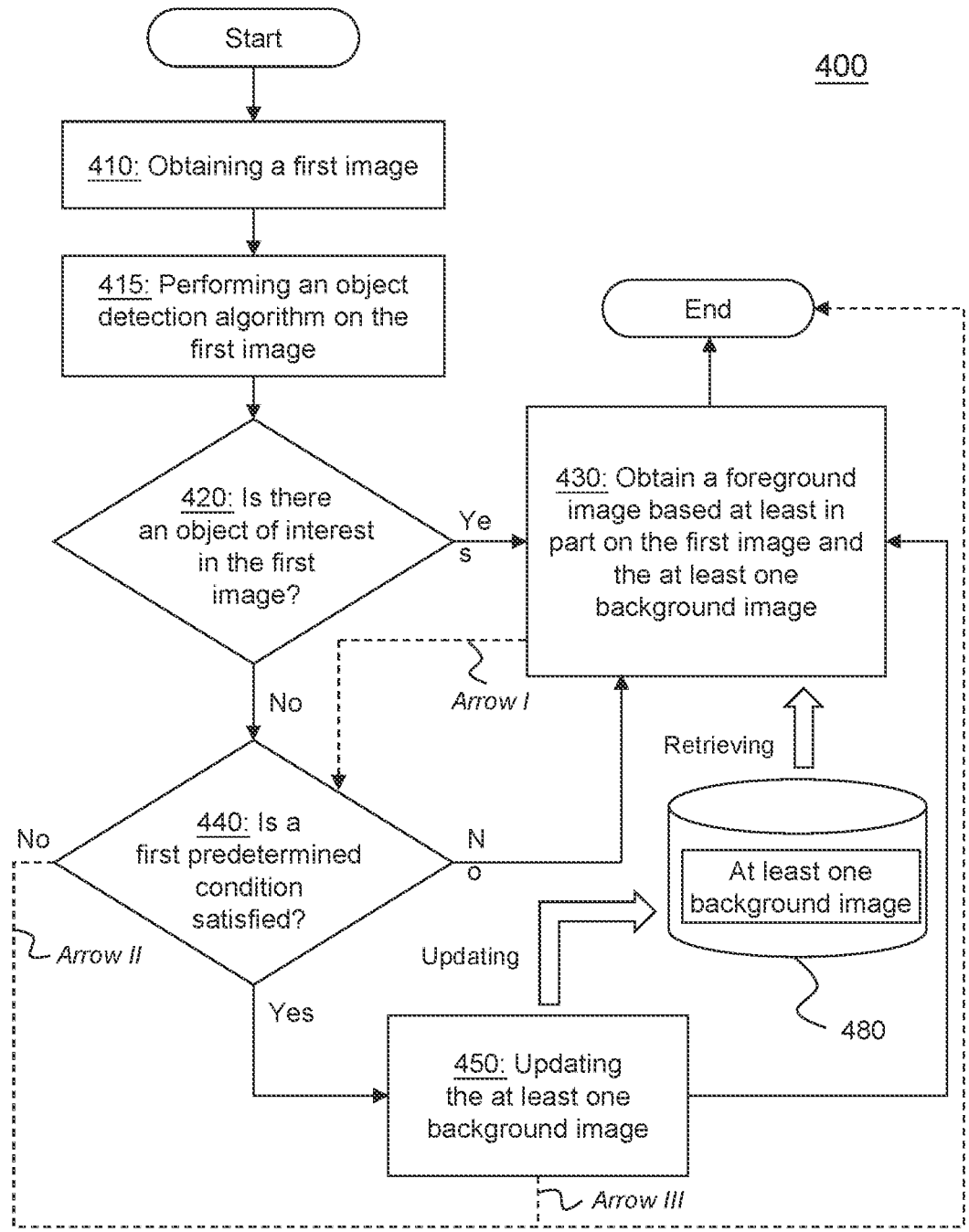
FIG. 4 is a flowchart illustrating an exemplary process for processing an image according to some embodiments of the present disclosure.

FIG. 4 is a flowchart illustrating an exemplary process 400 for processing an image according to some embodiments of the present disclosure. The process 400 may be implemented by the image processing device 300 illustrated in FIG. 3 for generating a foreground image of an image to be processed (first image) using at least one updatable background image. In embodiments, the process 400 illustrated in FIG. 4 may be implemented in the image processing system 100 illustrated in FIG. 1 (e.g., by the image processing device 120). For example, the process 400 illustrated in FIG. 4 may be stored in a storage device (e.g., the storage device 140, the storage device 220, the ROM 230, the RAM 240) in the form of instructions, and invoked and/or executed by one or more processors (e.g., the processor 210) of the image processing device 120.

In 410, the image obtaining module 310 may obtain a first image. The first image may be an image of a shooting scene captured by, e.g., the image capturing mechanism 110. The image obtaining module 310 may be configured to obtain the first image from the image capturing mechanism 110 or from a storage device (e.g., the storage device 140, the storage device 220, the RAM 240). In some embodiments, the first image may be a frame of a video file or a video stream.

The type of the first image may be based on the configuration of the image capturing mechanism 110. For demonstration purposes and the convenience of description, the first image may be described as a two-dimensional (2D) color image having a color space including multiple color channels (e.g., an RGB image, a YUV image). However, it is noted that the first image may also be of any other proper type, such as a greyscale image, a thermogram, a depth image (or range image), an image of a higher dimension (e.g., a three-dimensional (3D) image), or the like, or a combination thereof.

In some embodiments, the first image may be pre-processed in the operation 410. The preprocessing may include, for example, a noise reduction, a blur reduction, a distortion correction, a color correction, or the like, or a combination thereof.

In some embodiments, the image obtaining module 310 may further obtain at least one reference image. The at least one reference image may be associated with the first image, and be involved in the generation of the foreground image and the update of the at least one background image.

The first image and the at least one reference image may represent different aspects of substantially the same shooting scene, such as color, luminance, distance (or depth), temperature, radiation strength, etc. For each of the at least one reference image, pixels of at least a part of the first image may correspond to pixels of at least a part of the reference image. For example, the first image may include a region A, which may correspond to a region A' of the reference image. The region A/A' may be a part of the first/reference image or the whole first/reference image. Each pixel in the region A may have a corresponding pixel in the region A', and vice versa. A pair of corresponding pixels in the region A and region A' may correspond to the same point in the shooting scene, and may include information of different aspect of that point.

In some embodiments, the image obtaining module 310 may obtain a single reference image. For example, the first image may be a color image or a greyscale image, and the reference image may be a depth image. In some embodiments, the image obtaining module 310 may obtain multiple reference images representing different aspects of substantially the same shooting scene. For example, the first image may be a color image or a greyscale image, and the multiple reference image may include a depth image and a thermogram. It is understood that the first image and the reference image(s) may be of any other proper types.

In some embodiments, one of the at least one reference image may be generated by a sensor (e.g., the second sensor 112) of the image capturing mechanism 110. For example, the at least one reference image may include a depth image generated by a radar/lidar of the image capturing mechanism 110. As another example, the at least one reference image may include a thermogram generated by an FPA sensor of the image capturing mechanism 110.

In some embodiments, one of the at least one reference image may be generated based at least in part on a second image generated by a sensor (e.g., the second sensor 112) of the image capturing mechanism 110. For example, the second image may be pre-processed to generate the reference image. In some specific embodiments, the second image may be generated by the reference image model based on both the first image and the second image. For example, the at least one reference image may include a depth image, and the image capturing mechanism 110 may include two cameras arranged side by side for generating the first image and the second image. The depth image may be generated based on the first image and the second image using, for example, a stereo triangulation technique. In such embodiments, a reference image may be generated by the image processing device 300. For example, the image obtaining module 310 may obtain the second image and a reference image module (not shown) of the image processing device 300 may generate a reference image based at least in part on the second image. Alternatively or additionally, a reference image may be generated by or another device of the image processing system 100. For example, the image capturing mechanism 110 may include a built-in processor configured to generate the reference image. As another example, the image processing system 100 may include another device (not shown) for generating the reference.

In some embodiments, the first image and the at least one reference image may be integrated into a combined image. Each pixel of the combined image may include a plurality pixels values corresponding to difference aspects of the shooting scene. For example, the combined image may include both the color information and the depth (or distance) information of a shooting scene. Each pixel of such a combined image may include one or more first pixel values representing the color of a corresponding point in the shooting scene. The one or more first pixel values may correspond to the color channel(s) of the color space adopted by the image capturing mechanism 110. Additionally, each pixel of the combined image may also include at least one second pixel value representing a distance between a corresponding point in the shooting scene and a reference point associated with the image capturing mechanism 110. The aforementioned first image and the at least one reference images may be viewed as sub-images of such a combined image.

In some embodiments, the first image may be a sub-image of a combined image, but the other sub-image(s) of the combined image may not be involved in the process 400. Via the process 400, the sub-image of the combined image corresponding to the first image may be processed, but the other sub-image(s) may remain unchanged.

In 415, the object detection module 320 may perform an object detection algorithm on the first image to detect one or more objects of interests in the first image. The object detection module 320 may adopt various object detection algorithm for detecting the one or more objects of interest. For example, the object detection algorithm may include a Viola-Jones object detection framework based algorithm, a region-convolutional neural network (R-CNN) based algorithm, a fast R-CNN based algorithm, a faster based R-CNN algorithm, a single shot multibox detector (SSD) based algorithm, a You Only Look Once (YOLO) based algorithm, or the like, or a variant, or a combination thereof.

In some embodiments, the one or more objects of interests to be detected by the object detection module 320 may include multiple classes of objects. For example, the multiple classes may include a vehicle class, a human being class, and/or an animal class. The object detection module 320 may adopt a single algorithm, multiple algorithms, or a combined algorithm formed by combining multiple algorithms, etc., for detecting the multiple classes of objects.

In some embodiments, when one or more objects of interests are detected by the object detection module 320 in the first image, for each detected object, the object detection module 320 may output one or more position parameters representing an image region including the detected object. Such an image region may be referred to as a detected region. When the object detection module 320 detects no object of interest in the first image, the object detection module 320 may output a parameter indicating there is no object of interest detected in the first image.

In different embodiments, the one or more position parameters may include a coordinate range of the detected region, the coordinates of each pixel of the detected region, the coordinates of each pixel at the edge of the detected region, the serial number of the detected region, or the like, or a combination thereof. In some embodiments, the one or more position parameters may locate a frame (or box) enclosing the detected region. Such a frame may be formed by edges of the detected region. For the convenience of description, the detected region, or the frame enclosing the detected region, may be referred to as an object box. The shape or size of the object box may be preset according to actual needs. For example, the object box may be preset as rectangular, square, circular, elliptical, etc. In some specific embodiments, the object box may be rectangular. The one or more position parameters may include one or more of the following parameters: coordinates of one or more vertices (e.g., the top left vertex) of the object box, the width of the object box, the length of the object box, coordinates of the central point of the object box, the half-width of the object box, the half-length of the object box, etc.

In some embodiments, the object box may be selected by the object detection module from a plurality of predetermined boxes by performing the object detection algorithm on each of at least a part of the plurality of predetermined boxes. The plurality of predetermined boxes may represent different regions of the first image. For example, the plurality of predetermined boxes may include a first predetermined box and a second predetermined box. The first predetermined box and the second predetermined box may have the same size/shape or different sizes/shapes. The first predetermined box may be separated from, partially overlapped with, or include the second predetermined box. In some specific embodiments, each of the plurality of predetermined boxes may be associated with a serial number, and the one or more position parameters may include the serial number of the object box. Based on the serial number, image data of the image region corresponding to the object box may be retrieved for further processing.

In some embodiments, according to the object detection algorithm adopted by the object detection module 320, for each detected object box (or the corresponding image region), the object detection module 320 may output a possibility parameter representing a possibility that the object box includes an object of interest. For example, the possibility parameter may be a number between 0 to 1. The larger the possibility parameter, the larger the possibility that the object box includes an object of interest.

In some embodiments, according to the object detection algorithm adopted by the object detection module 320, the object detection module 320 may output a global possibility parameter representing a possibility that the whole first image includes an object of interest. For example, the global possibility parameter may be a number between 0 to 1. The larger the global possibility parameter, the larger the possibility that the first image includes an object of interest. In some specific embodiments, the object detection module 320 may determine the global possibility parameter based on the possibility parameter(s) associated with the object box(es) detected by the object detection module 320. For example, the global possibility parameter may be a mean, a weighted mean, a median, a mode, etc., of the possibility parameters associated with the image regions. In some specific embodiments, the global possibility parameter may be a weighted mean of the possibility parameters associated with the object boxes. Weights of the possibility parameters may be determined based on sizes and/or positions of the object boxes in the first image. By introducing the global possibility parameter, the possibility that there is an undetected object of interest in the first image may be reduced.

In some specific embodiments, the global possibility parameter may have only two values, such as 0 and 1. One value (e.g., 0) may represent there is no object of interest in the first image, and the other value (e.g., 1) may represent there is at least one object of interest in the first image.

In some specific embodiments, when one or more objects of interest are detected in the first image, the object detection module 320 may only output the global possibility parameter without outputting the aforementioned position parameter(s) of image region(s) including the detected object.

In 420, the control module 350 may determine whether there is an object of interest in the first image based on the detection result of the object detection module 320. Upon a determination that there is an object of interest in the first image, the control module 350 may cause the foreground image module 330 to perform the operation 430. Upon a determination that there is no object of interest in the first image, the control module 350 may perform the operation 440.

In some embodiments, when the object detection module 320 outputs one or more position parameters, the control module 350 may cause the foreground image module 330 to perform the operation 430. When the object detection module 320 outputs a parameter indicating there is no object of interest detected in the first image, the control module 350 may perform the operation 440.

In some embodiments, when the object detection module 320 outputs a global possibility parameter, the control module 350 may compare the global possibility parameter with a threshold (e.g., 0.5, 0.8, 0.9, 1). For example, when the global possibility parameter is equal to or more than the threshold, the object detection module 320 may determine there is at least one object of interest in the first image, and cause the foreground image module 330 to perform the operation 430. When the global possibility parameter is less than the threshold, the object detection module 320 may determine that there is no object of interest in the first image, and then perform the operation 440.

In some embodiments, the global possibility parameter may be determined by the control module 320 instead of the object detection module 320. For example, the control module 350 may determine the global possibility parameter based on the possibility parameter(s) associated with the object box(es) detected by the object detection module 320.

In 430, the foreground image module 330 may retrieve at least one background image from a first storage device 480, and obtain a foreground image based at least in part on the first image and the at least one background image. The foreground image module 330 may adopt various background filtering (or background subtraction, foreground detection) approaches for generating the foreground image. For example, the foreground image module 330 may generate a difference image based at least in part on the first image and the at least one background image, and generate the foreground image based on the difference image.

The first storage device 480 may be configured to store the at least one background image for generating the foreground image. The first storage device 480 may be the storage device 140, the storage device 220, the RAM 240, or another storage device. The at least one background image stored in the first storage device 480 may be updatable. When the at least one background image is updated before the operation 430, the foreground image module 330 may retrieve the updated background image(s) for generating the foreground image.

In some embodiments, the at least one background image may include a first background image corresponding to the first image. The first background image and the first image may have substantially the same size and shape. A pixel of the first background image and a pixel of the first image may have one or more corresponding pixel values.

In some embodiments, the foreground image module 330 may retrieve a single background image from the first storage device 480 and generate the foreground image based on the first image and the single background image. The single background image may be the above first background image. The foreground image module 330 may adopt any proper background filtering approach in the art for generating the foreground image.

In some embodiments, the foreground image module 330 may generate the difference image based on the first image and the first background image. The difference image may represent a difference between the first image and the first background image, and may be obtained by subtracting the first background image from the first image (or a corresponding part of the first image). For example, pixels of the difference image may correspond to pixels of the first image and pixels of the first background image. Each pixel of at least a part of the difference image may represent a difference between corresponding pixels in the first image and the first background image. For example, a pixel $P_a$ of the first image may include M pixel values, wherein M may be an integer equal to or more than 1. The first background image may include a pixel $P_b$ corresponding to the pixel $P_a$, which may also include M pixel values. For an ith ($1 \leq i \leq M$) pixel value $L_i$ of the pixel $P_a$, the pixel $P_b$ may also include an ith pixel value $B_i$ corresponding to the pixel value $L_i$. The pixel values $P_i$ and $B_i$ may be associated with the same aspect (e.g., the same color channel, depth, temperature) of a corresponding point in the shooting scene. The difference image may include a pixel $P_c$ corresponding the pixel $P_a$ and the pixel $P_b$. The pixels $P_a$, $P_b$, and $P_c$ may have the same coordinates in the respective images. The pixel $P_c$ may also include M pixel values, and an ith pixel value $D_i$ of the pixel $P_c$ may be obtained by:

$$D_i = L_i - B_i, \text{Function} \tag{1}$$

$$\text{or } D_i = |L_i - B_i|. \tag{Function 2}$$

After the difference image is obtained, the foreground image module 330 may determine, for each pixel of at least a part of the difference image, whether the pixel is a foreground pixel or a background pixel. As used herein, a foreground pixel of the difference image may correspond to the foreground of the first image, e.g., the object of interest(s) in the first image, and a background pixel of the difference image may correspond to the background of the first image. In some embodiments, the foreground image module 330 may determine, for each pixel of at least a part of the difference image, whether the pixel is a foreground pixel or a background pixel based on one or more pixel values of the pixel and one or more corresponding thresholds. Take the pixel $P_c$ of the difference image as an example. The foreground image module 330 may determine whether the pixel $P_c$ is a foreground pixel or a background pixel based on an mth ($1 \leq m \leq M$) pixel value $D_m$ of the pixel $P_c$ and a corresponding threshold T. When $D_m \geq T$ (or $|D_m| \geq T$) the pixel $P_c$ may be determined as a foreground pixel; and when $D_m < T$ (or $|D_m| < T$), the pixel $P_c$ may be determined as a background pixel. As another example, the foreground image module 330 may determine whether the pixel $P_c$ is a foreground pixel or a background pixel based on the pixel value $D_m$ and corresponding thresholds $T_c$ and $T_r$, wherein $T_r<T_c$. When $T_r \le D_m \le T_c$, the pixel $P_c$ may be determined as a background pixel; and when $D_m<T_r$ or $D_m>T_c$, the pixel $P_c$ may be determined as a foreground pixel.

The foreground image module 330 may determine whether a pixel is a foreground pixel or a background pixel based on a single pixel value of the pixel (e.g., via the above process associated with the pixel value $D_m$) or based on multiple pixel values of the pixel. When multiple pixel values are used for such a determination, the foreground image module 330 may obtain a feature value based on the multiple pixel values, and compare the feature value with one or more corresponding thresholds, e.g., via a process similar to the above process associated with the pixel value $D_m$. The feature value may be a mean, a weighted mean, a mode, a median, etc., of the multiple pixel values. When the feature value is in a predetermined value range, the foreground image module 330 may determine that the pixel is a foreground pixel. Otherwise the foreground image module 330 may determine that the pixel is a background pixel. Alternatively, for each pixel value of the multiple pixel values, the foreground image module 330 may compare the pixel value with one or more corresponding thresholds, e.g., via a process similar to the above process associated with the pixel value $D_m$. When one or more of (or all of) the multiple pixel values are in the corresponding predetermined value ranges, the foreground image module 330 may determine that the pixel is a foreground pixel. Otherwise the foreground image module 330 may determine that the pixel is a background pixel.

In some specific embodiments, the multiple pixel values may correspond to different color channels (e.g., color channels R, G, and B). Each color channel may be associated with a weight according to the sensitiveness of the human eye toward the corresponding color. The feature value may be a weighted mean of the multiple pixel values. It is noted that the foreground image module 330 may also adopt any other proper approach for determining whether a pixel is a foreground pixel or a background pixel.

In some embodiments, the result of the foreground pixel/background pixel determination may be in the form of a mask. Each pixel of the mask may correspond to a pixel of the first image and a pixel of the difference image, and may represent whether the corresponding pixel in the first image is the foreground of the first image or the background of the first image. Such a mask may be referred to as a foreground mask. In some specific embodiments, the foreground mask may be a binary image, and each pixel of the foreground mask may include one pixel value that can only have two values, i.e., a first value or a second value. For example, the first value may be 0 or NULL, and the second value may be 1 or 255. When a pixel of the difference image is determined as a foreground pixel, the pixel value of the corresponding pixel in the foreground mask may be set as the second value. When a pixel of the difference image is determined as a background pixel, the pixel value of the corresponding pixel in the foreground mask may be set as the first value or remain unchanged (e.g., the pixel value of each pixel in the initiate foreground mask may be the first value).

The foreground image module 330 may generate the foreground image based at least in part on the pixels of the difference image determined as foreground pixels (e.g., according to the foreground mask). Examples for generating the foreground image are provided as below, which are provided for demonstration purposes and not intended to be limiting.

In some embodiments, the foreground image module 330 may directly use foreground pixels in the difference image for generating the foreground image. For example, the foreground image module 330 may extract (e.g., copy, segment), from the first image, pixels corresponding to the foreground pixels in the difference image. The extracted pixels may form the foreground image.

In some embodiments, the foreground image module 330 may count the total number of the foreground pixels in the difference image. When the total number of the foreground pixels is more than a predetermined threshold, the foreground image module 330 may determine that there is at least one object of interest in the first image, and generate the foreground image using the foreground pixels in the difference image. For example, the foreground image may extract, from the first image, pixels corresponding to the foreground pixels in the difference image to form the foreground image. When the total number of the foreground pixels is less than or equal to the predetermined threshold, the foreground image module 330 may determine that there is no object of interest in the first image. Under such a situation, the foreground image module 330 may skip generating the foreground image using the foreground pixels in the difference image. In some embodiments, the foreground image module 330 may generate a blank image as the foreground image when it is determined that there is no object of interest in the first image. Each pixel of the blank image may include a pixel value indicating that the pixel is blank, i.e., not a part of an object of interest. Such a pixel may be referred to as a blank pixel. In some embodiments, blank pixels in the foreground image may be displayed in the same color, such as white, black, green, pink, or transparent.

In some embodiments, the difference image may include one or more image regions (or be referred to as difference image regions). For each of the one or more difference image regions, the foreground image module 330 may count the number of the foreground pixels in the difference image region. When the number of the foreground pixels in the difference image region is more than a predetermined threshold, the foreground image module 330 may determine that there is at least one object of interest in the difference image region, and generate a corresponding filtered image using the foreground pixels in the difference image region. For example, the foreground image module 330 may extract, from the first image, pixels corresponding to the foreground pixels in the difference image region to form a corresponding filtered image. As another example, the foreground image module 330 may extract, from the first image, all the pixels corresponding to the difference image region to form a corresponding filtered image. According to the actual needs, each filtered image may be a corresponding image region of the foreground image, or be treated as an independent foreground image. When the number of the foreground pixels in the difference image region is less than or equal to the predetermined threshold, the foreground image module 330 may determine that there is no object of interest in the difference image region. Under such a situation, the foreground image module 330 may skip generating the corresponding filtered image using the foreground pixels in the difference image. In some embodiments, the foreground image module 330 may generate a blank image as the corresponding filtered image when it is determined that there is no object of interest in the first image.

After processing the one or more difference image regions, the foreground image module 330 may obtain one or more filtered images, or obtain no filtered image. In some embodiments, the one or more difference image regions may be processed in parallel for generating the one or more filtered images, so as to reduce the time cost of the operation 430.

In some embodiments, the foreground image module 330 may directly output the one or more filtered images as one or more corresponding foreground images. In some embodiments, the foreground image module 330 may combine the one or more filtered images to form a single foreground image and output the foreground image. In some embodiments, the foreground image module 330 may combine the overlapped and/or adjacent filtered images of the obtained one or more filtered images to form one or more foreground images and output the one or more foreground images.

In some embodiments, when each of the one or more difference image regions is determined as including no object of interest (e.g., no filtered image is obtained), the foreground image module 330 may skip generating the foreground image, or generate a blank image as the foreground image. In some specific embodiments, under such a situation, the foreground image module 330 may output a parameter indicating that there is no object of interest in the first image. The parameter may be received by the foreground image control module 350, causing the foreground image control module 350 to perform the operation 440. Such an operation may be referred to as a false-positive-result correction, and is indicated by the broken arrow I illustrated in FIG. 4. The false-positive-result correction may reduce the influence of a false-positive detection result (i.e., it is detected that there is at least one object of interest in the first image but actually there isn't) of the object detection module 320 on the processing of the first image or a video including the first image, so as to improve the background filtering performance.

The false positive-result correction may be performed when the object detection module 320 detects one or more objects of interest in the first image in the operation 615 but the foreground image module 330 determines that there is no object of interest in the first image in the operation 630. The false-positive-result correction may not be performed when the object detection module 320 detects no object of interest in the first image (e.g., when the operation 430 is performed after the operation 440 or 450). It is noted that the false-positive-result correction is optional, and may be removed from the process 400 in some embodiments of the present disclosure.

The one or more difference image regions may be obtained in various approaches. In some embodiments, the foreground image module 330 may obtain the whole difference image based on the first image and the first background image, and then dividing the difference image into the one or more difference image regions. For example, the one or more difference image regions may be image tiles obtained by the foreground image module 330 (or another component of the image processing device 300) by dividing the difference image based on a predetermined layout pattern (e.g., a tailing operation). As another example, the one or more difference image regions may correspond to one or more predetermined coordinate ranges, each of which is considered as having a greater chance to include an object of interest than other coordinate ranges in most images according to empirical practices. As a further example, the one or more difference image regions may correspond to the one or more object boxes determined by the object detection module 320 in the operation 415.

In some embodiments, the difference image, or the one or more difference image regions of the difference image, may be generated based further on the at least one reference image and other background image(s) of the at least one background image. For example, besides the first background image corresponding to the first image, the at least one background image may further include a second background image corresponding to each of the at least one reference image, thereby including at least one second background image. The foreground image module 330 may generate the difference image based on the first image, the first background image, the at least one reference image, and the at least one second background image. Examples for such a process are provided as following for demonstration purposes and not intended to be limiting.

In some embodiment, the foreground image module 330 may generate a mean image based on the first image and the at least one reference image, and generate a mean background image based on the first background image and the at least one second background image. The mean image may be a weighted mean of the first image and the at least one reference image, and the mean background image may be a weighted mean of the first background image and the at least one second background image. In different embodiments, the weights associated with the first image (or the first background image) and the at least one reference image (or the at least one second background image) may be fixed (e.g., 1:1, 2:1), selected from predetermined weights, input by a user, dynamically generated, or self-adaptively adjusted, etc. The foreground image module 330 may generate the difference image based on the mean image and the mean background image. For example, the foreground image module 330 may generate the difference image by subtracting the mean background image from the mean image.

In some specific embodiments, the difference image may include one or more difference image regions, and the mean image (or the mean background image) may include one or more mean image regions (or mean background image region) corresponding to the one or more difference image regions. Each of the one or more mean image regions may be a weighted mean of a corresponding region in the first image (or the first background image) and a corresponding region (or regions) of the at least one reference image (or the at least one second background image). Different mean image regions may be obtained by the same set of weights or different sets of weights.

In some embodiments, the foreground image module 330 may select images from the first image, the first background image, the at least one reference image, and the at least one second background image for generating different image portions (e.g., difference image regions) of the difference image. The obtained image portions may be combined to form the difference image or at least a part thereof. Based on the selection result, different image portions of the difference image may be generated by the same set of images or different sets of images. For example, the first image, the at least one reference image, and the at least one background image may form a plurality of image sets, which may correspond to different aspect of the shooting scene. Each of the plurality of image sets may include an image to be filtered and a corresponding background image. The image to be filtered may be the first image or one of the at least one reference image. Each image portion may be generated based on an image set selected from the plurality of image sets. Via such an approach, the foreground image module 330 may generate each image portion of the difference image using an image set selected to improve the performance of the background filtering on the corresponding local portion of the first image, thereby improving the overall performance of the background filtering on the whole first image. Detailed descriptions of such a process are provided elsewhere in the present disclosure (e.g., in connection with FIGS. 8 to 11).

In some embodiments, the foreground image module 330 may determine whether a third predetermined condition is satisfied, and perform the above selection based at least in part on the determination result.

In some embodiments, the first image and the at least one reference image may be sub-images of a combined image. Correspondingly, the first background image and the at least one second background image may also be sub-images of a combined background image.

In 440, the control module 350 may determine whether a first predetermined condition is satisfied. Upon a determination that the first predetermined condition is satisfied, the control module 350 may cause the background image updating module 340 to perform the operation 450. Upon a determination that the first predetermined condition is not satisfied, the control module 350 may cause the foreground image module 330 to perform the operation 430.

The first predetermined condition may be set according to actual needs. In some embodiments, the first predetermined condition may be based on one or more condition parameters. The one or more condition parameters may be updated (e.g., by the control module 350) before, during, or after the process 400. Correspondingly, the process 400 may further include operations for updating the one or more condition parameters. In different embodiments of the present disclosure, the first predetermined condition and/or the one or more condition parameters may take different forms.

In some specific embodiments, the first image may be an Nth frame of a video, wherein N is an integer above 1. The first predetermined condition may be associated with a condition parameter X, which may be related to a count of successive frames determined as including no object of interest before the Nth frame in the video. Upon the determination that there is no object of interest in the first image, the control module 350 may update the condition parameter X. For example, the control module 350 may plus the condition parameter X by 1. Upon the determination that there is an object of interest in the first image, the control module 350 may reset the condition parameter X to its initial value, e.g., as 0. Upon the determination that the first predetermined condition is satisfied, the control module 350 may also reset the condition parameter X to its initial value, e.g., as 0. The first predetermined condition may be based on the condition parameter X. For example, the first predetermined condition may include that the condition parameter X is more than a threshold Y. When the condition parameter X is more than the threshold Y, the control module 350 may cause the background image updating module 340 to perform the operation 450. When the condition parameter X is less than or equal to the threshold Y, the control module 350 may skip the operation 450.

In 450, the background image updating module 340 may update the at least one background image stored in the first storage device 480, thereby obtaining at least one updated background image. The at least one background image may be updated based on at least one image determined (e.g., by the object detection module 320, another component of the image processing device 300, or another device) as including no object of interest. After the at least one background image in the first storage device 480 is updated, in a next background filtering operation for generating a corresponding foreground image (e.g., the operation 430 of the current the process 400, the operation 430 or a next the process 400, another operation other than the operation 430), the foreground image may be generated based on the at least one updated background image. For the convenience of description, an image used to update the at least one background image may be referred to as a candidate image. The at least one candidate image and the first image may be images about substantially the same shooting scene.

In some embodiments, the at least one candidate images and the first image may be both generated by the image capturing mechanism 110. However, it is also possible that the at least one candidate image and the first image are generated by different image capturing devices. In some embodiments, the one or more candidate images and the first image may be frames of the same video, or frames of different videos of the same shooting scene.

In some embodiments, that at least one background image may include a background image corresponding to the first image, i.e., the aforementioned first background image. Correspondingly, the at least one candidate image may include a first candidate image for updating the first background image.

In some embodiments, the first image may be a first frame of a video (a video file or a video stream), and the first candidate image may be obtained based on at least one second frame of the video. For example, the first candidate image may be a second frame of the video, or be generated based at least in part on a second frame of the video or multiple second frames of the video. The at least one second frame may be determined as including no object of interest. In some embodiments, the at least one second frame may be before the first frame. In some embodiments, when the video is a video file, the at least one second frame may include one or more frames after the first frame.

The background image updating module 340 may update the first background image based at least in part on the first candidate image. The background image updating module 340 may update the first background image in various approaches. Exemplary approaches are described as following, which are merely for demonstration purposes and not intended to be limiting.

In some embodiments, the background image updating module 340 may directly replace the original first background image with the first candidate image. The first candidate image may serve as the new first background image (or updated first background image) and be used for a next background filtering operation (e.g., the operation 430). Such an approach may be referred to as an image replacement approach.

In some embodiments, the background image updating module 340 may generate an updated first background image based on the original first background image and the first candidate image. For example, the updated first background image may be a mean or a weighted mean of the original first background image and the first candidate image. Such an approach may be referred to as an image increment approach.

In some embodiments, the background image updating module 340 may obtain a background difference image based on the original first background image and the first candidate image. The background difference image may represent a difference between the original first background image and the first candidate image. The process for generating the background difference image may be the same as or similar to the process for generating a difference image in the operation 430. Based on the background difference image, the background image updating module 340 may modify the original first background image to generate the updated first background image. Such an approach may be referred to as a local increment approach. For example, the background image updating module 340 may determine, for each pixel of the background difference image, whether the pixel represent a remarkable difference or a negligible difference. The process of performing such a determination may be similar to the process for determining whether a pixel in a difference image is a foreground pixel or a background pixel. For each pixel representing a remarkable difference, the background image updating module 340 may update the corresponding pixel (first pixel) in the original first background image based at least in part on the corresponding pixel (second pixel) in the first candidate image. For example, the background image updating module 340 may replace the pixel value(s) of the first pixel with the pixel value(s) of the second pixel. As another example, the update first pixel may be a mean or a weighted mean of the original first pixel and the second pixel.

In some embodiments, the background image updating module 340 may use a model for generating the original first background image. Then to update the first background image, the background image updating module 340 may update the model based at least in part on the first candidate image, and use the updated model to generate a new background image as the updated background image. Such an approach may be referred to as a model update approach. For example, the model may be a Gaussian model, a Gaussian mixture model, a machine learning model (e.g., a convolutional neural network (CNN) based model), or the like, or a combination thereof. The background image updating module 340 may adopt various techniques in the art for obtaining and/or updating such a model for generating the background image, which are not described herein.

In some embodiments, in the operation 430, the foreground image module 330 may generate the foreground image based on the first image and the first background image. No reference image is involved in the generation of the foreground image. Correspondingly, the at least one background image may only include the first background image, and the background image updating module 340 may only need to update the first background image.

In some embodiments, in the operation 430, the foreground image module 330 may generate the foreground image based further on at least one reference image, and the at least one background image may include the first background image and at least one second background image corresponding to the at least one reference image. Correspondingly, the at least one candidate image may include the first candidate image and a second candidate image corresponding to each of the at least one second background image (thereby including at least one second candidate image). The background image updating module 330 may update each of the at least one second background image based at least in part on the corresponding second candidate image. The above provided approaches (e.g., the image replacement approach, the image increment approach, the local increment approach, the model update approach) or any other approach for updating the first background image may also be adopted for updating each of the at least one second background image.

The approach for updating a second background image may be the same as, similar to, or different from the approach for updating the first background image. For example, the approach for updating the second background image may be the image replacement approach, and the approach for updating the first background image may also be the image replacement approach, or be another approach such as the image increment approach or the model update approach. When the at least one second background image includes a second background image A and a second background image B, the approach for updating the second background image A may be the same as, similar to, or different from the approach for updating the second background image B.

In some embodiments, the first candidate image may be the first image obtained in the current process 400. In some embodiments, the at least one second candidate image may be the at least one reference image obtained in the current process 400.

In some embodiments, the first image and the at least one reference image may be sub-images of a combined image, and the first background image and the at least one second background image may also be sub-images of a combined background image. Correspondingly, the first candidate image and the at least one second candidate image may also be sub-images of a combined candidate image.

In some embodiments, the at least one candidate image may also be updatable. For example, the image processing device 300 may further include a candidate image updating module 360 for obtaining or updating the at least one candidate image based on at least one image determined (e.g., by the object detection module 320 or a device other than the image processing device 300) as including no object of interest.

In some embodiments, the at least one candidate image may be updated based at least in part on the first image when it is determined that there is no object of interest in the first image in the operation 420. For example, the background image updating module 340 may obtain the updated first candidate image based on the first image and the original first candidate image. As another example, the background image updating module 340 may obtain, for each second candidate image, the updated second candidate image based on the corresponding reference image and the original second candidate image.

In some embodiments, the background image updating module 340 may further determine whether a second predetermined condition is satisfied. Upon the determination that the second predetermined condition is satisfied, the background image updating module 340 may update the at least one candidate image. Upon the determination that the second predetermined condition is not satisfied, the background image updating module 340 may skip the updating of the at least one candidate image. An example of such a process is described in connection with FIG. 6.

After the operation 450, the foreground image module 330 may perform the operation 430 to generate a foreground image of the first image.

It is noted that performing the operation 430 after the operation 450 or the operation 440 (when the first determination condition is not satisfied) is not necessary. In some embodiments, upon a determination that the first predetermined condition is not satisfied, instead of causing the foreground image module 330 to perform the operation 430, the control module 350 may skip the operation 430 and end the process 400, as indicated by the broken arrow II illustrated in FIG. 4. Alternatively or additionally, after the operation 450 is performed, the operation 430 may also be skipped and the process 400 may be ended, as indicated by broken arrow III in FIG. 4 (which is partially overlapped with the broken arrow II illustrated in FIG. 4). By performing the operation 430 no matter the determination result of the operation 420, the possibility that one or more objects of interest in the first image are not detected by the object detection module 320 in the operation 415 may be reduced to prevent a loss of valuable data. However, by skipping the operation 430 when there is no object of interest detected in the first image, the computation burden and the time cost of the process 400 may be reduced, and the additional cost for analyzing foreground images with no object of interest may also be avoided. The above choice for implementing the process 400 may be made according to the actual needs, the application field of the process 400, and/or the performance of the object detection algorithm adopted by the object detection module 320, etc.

In some embodiments, when the operation 430 is performed after the operation 440 or 450, the foreground image module 330 may output a blank image as the foreground image to reduce the computation burden and the time cost of the process 400.

In some embodiments, if the false-positive-result correction (e.g., indicated by the broken arrow I in FIG. 4) has been performed, then after the operation 440 or 450, the operation 430 may be skipped and the process 400 may be ended (e.g., indicated by the broken arrows II and III in FIG. 4), so as to prevent an endless loop formed by operations 430 to 450.

In some embodiments, the image processing device 300 may repeat the process 400 to process a pre-captured video. Each frame of the video may be treated as a first image, and one or more foreground images may be generated by processing the video. The generated foreground images may form a foreground video, which may be further processed, analyzed, or temporarily stored in a storage device.

In some embodiments, the image processing device 300 may perform the process 400 in real time. For example, when a frame (first image) is generated by the image capturing mechanism 110 and transmitted to the image processing device 300, the image processing device 300 may buffer (or store) the frame in a queue. The image processing device 300 may process frames buffered in the queue sequentially via the process 400. In some embodiments, the image processing device 300 may selectively process the frames buffered in the queue based on, e.g., the current workload of the image processing device 300, a predetermined frame selection/drop strategy, etc., to improve the real-time performance of the image processing device 300. In some specific embodiments, the obtained foreground images may be further processed and/or analyzed in real time, so as to detect currently occurring events (e.g., criminal activity, emergency, accident) and/or perform a real-time identity recognition.

It is noted that the above descriptions of the process 400 are only for demonstration purposes, and not intended to be limiting. It is understandable that after learning the major concept of the present disclosure, a person of ordinary skills in the art may alter the process 400 in an uncreative manner. For example, the operations above may be implemented in an order different from that illustrated in FIG. 4. One or more optional operations may be added to the flowcharts. One or more operations may be split or be combined. All such modifications are within the scope of the present disclosure.

Figure 5:
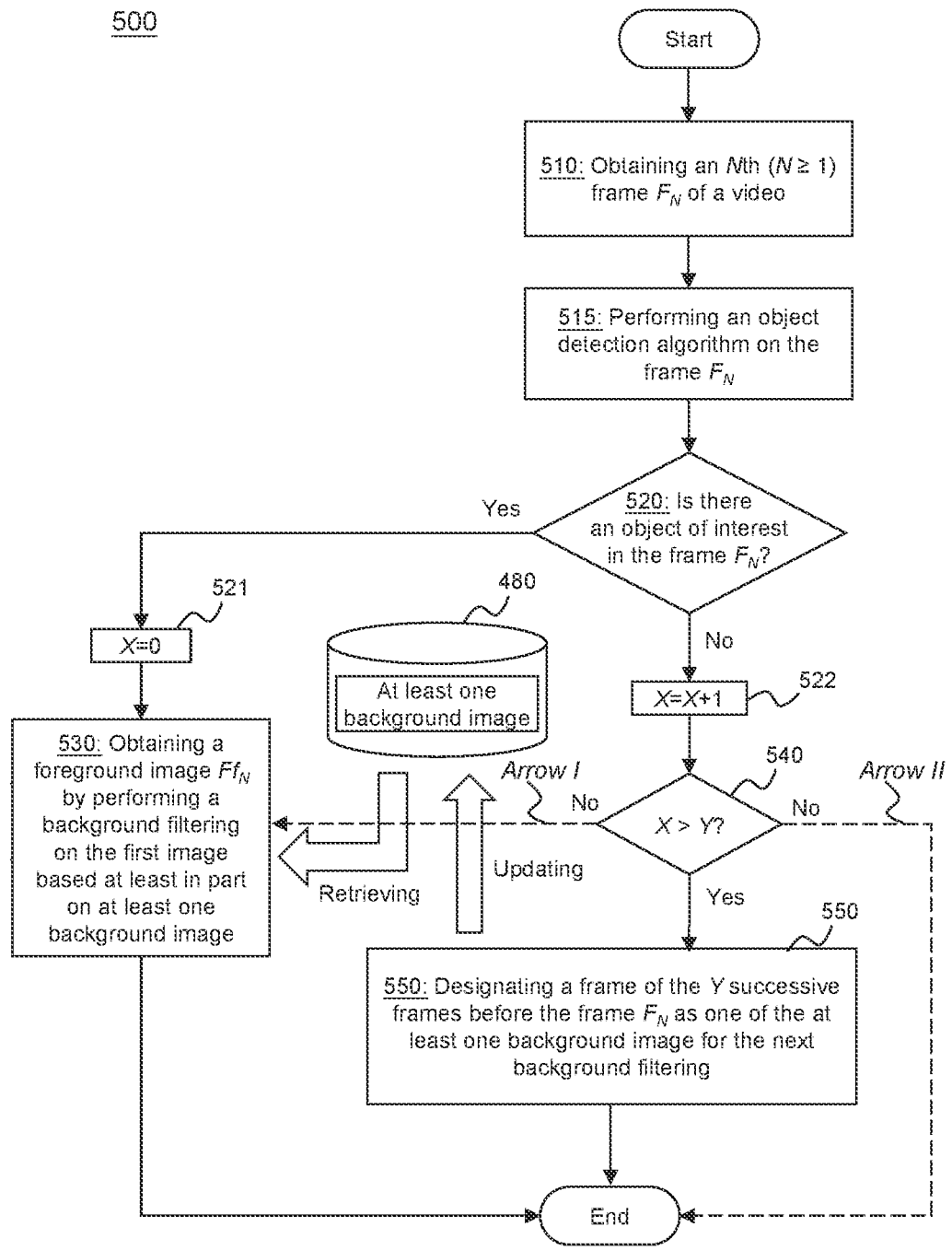
FIG. 5 is a flowchart illustrating an exemplary process for processing an image according to some embodiments of the present disclosure.

FIG. 5 is a flowchart illustrating an exemplary process 500 for processing an image according to some embodiments of the present disclosure. The process 500 may be an example of the process 400 illustrated in FIG. 4, and may be implemented by the image processing device 300 illustrated in FIG. 3 for generating a foreground image of an image to be processed (first image) using at least one updatable background image. In some embodiments, the process 500 illustrated in FIG. 5 may be implemented in the image processing system 100 illustrated in FIG. 1 (e.g., by the image processing device 120). For example, the process 500 illustrated in FIG. 5 may be stored in a storage device (e.g., the storage device 140, the storage device 220, the ROM 230, the RAM 240) in the form of instructions, and invoked and/or executed by one or more processors (e.g., the processor 210) of the image processing device 120.

In the process 500, the image to be processed (first image) may be a frame of a video. The first predetermined condition for updating the at least one background image may be based on a condition parameter X, which may represent a count of successive frames determined, by the object detection module 320, as including no object of interest before the image to be processed.

In 510, the image obtaining module 310 may obtain an Nth frame $F_N$ (first image) of the video. In some embodiments, the image obtaining module 310 may further obtain at least one reference image associated with the frame $F_N$. For example, the frame $F_N$ may be a color image, and the at least one reference image may include a corresponding depth image. The operation 510 may be the same as or similar to the operation 410.

In 515, the object detection module 320 may perform an object detection algorithm on the frame $F_N$ to detect one or more objects of interests in the frame $F_N$. The operation 515 may be the same as or similar to the operation 415. For different types of objects of interest, the object detection algorithm adopted by the object detection module 320 may be different. The object detection algorithm adopted by the object detection module 320 is not limited in the present disclosure.

In some embodiments, by performing the object detection algorithm on the frame $F_N$, one or more object boxes may be obtained. Each of the one or more object boxes may correspond to at least one detected object of interest. When multiple objects of interest are detected in the frame $F_N$, multiple object boxes may be obtained via the operation 515.

In 520, the control module 350 may determine whether there is an object of interest in the frame $F_N$ based on the detection result of the object detection module 320. The operation 520 may be the same as or similar to the operation 420. Upon a determination that there is an object of interest in the frame $F_N$, the control module 350 may perform the operation 521. Upon a determination that there is no object of interest in the frame $F_N$, the control module 350 may perform the operation 522.

In 521, the control module 350 may reset the condition parameter X as 0, and cause the foreground image module 330 to perform the operation 530.

In 530, the foreground image module 330 may obtain a foreground image $Ff_N$ by performing a background filtering on the first image based at least in part on at least one background image. The foreground image module 330 may retrieve the at least one background image from the first storage device 480. In some embodiments, the foreground image module 330 may obtain the foreground image $Ff_N$ based further on the at least one reference image obtained by the image obtaining module 310. The operation 530 may be the same as or similar to the operation 430.

In some embodiments, the operation 521 may be performed during or after the operation 530. In some embodiments, the operations 521 and 530 may be combined into the same operation. In some embodiments, the operation 521 may be performed by the foreground image module 330 instead of the control module 350.

In some embodiments, in the operation 530, the foreground image module 330 may obtain a difference image by subtracting a corresponding background image (e.g., first background image) from the frame $F_N$. Each pixel of the difference image may represent a difference between corresponding pixels of the first background pixel and the frame $F_N$. The difference image may include one or more difference image regions. For example, the one or more difference image regions may correspond to the one or more object boxes determined in the frame $F_N$ in the operation 520. For each of the one or more difference image regions, the foreground image module 330 may determine, for each pixel of the difference image region, whether the pixel is a foreground pixel or a background pixel. In some embodiments, the foreground image module 330 may compare each pixel value of the pixel with a corresponding threshold. When one or more pixel values of the pixel are more than the corresponding thresholds, the foreground image module 330 my determine that the pixel is a foreground pixel. Otherwise, the foreground image module 330 may determined that the pixel is a background pixel. The threshold associated with each pixel value may be set or adjusted according to actual needs. For example, when a pixel value of the pixel is associated with a color channel, the corresponding threshold may be set as 25 greyscales (or another proper number). As another example, when a pixel value of the pixel is associated with depth information, the corresponding threshold may be set as 30 cm (or another proper number). Then the foreground image module 330 may determine, for each of the one or more difference image regions, whether the number of foreground pixels in the difference image region is more than a predetermined threshold. Upon a determination that the number of foreground pixels in the difference image region is more than the predetermined threshold, the foreground image module 330 may determine that the corresponding region in the frame $F_N$ belongs to the foreground of the frame $F_N$ (includes the object of interest). Upon a determination that the number of foreground pixels in the difference image region is equal to or less than the predetermined threshold, the foreground image module 330 may determine that the corresponding region in the frame $F_N$ belongs to the background of the frame $F_N$, which may be removed by background filtering.

In some embodiments, for each object box in the first image, the foreground image module 330 may perform the background filtering in parallel. For example, the foreground image module 330 may concurrently process the corresponding difference image regions in the difference image.

In 522, the control module 350 may plus the condition parameter X by 1, and then perform the operation 540.

In 540, the control module 350 may determine whether the condition parameter X is more than a predetermined threshold Y (first predetermined condition). Upon a determination that the condition parameter X is more than the threshold Y, the control module 350 may cause the background image updating module 340 to perform the operation 550 to update the at least one background image. Upon a determination that the condition parameter X is equal to or less than the threshold Y, the control module 350 may cause the foreground image module 330 to perform the operation 530 with the non-updated at least one background image (e.g., as indicated by the broken arrow I illustrated in FIG. 5). Alternatively, the control module 350 may end the process 500 (e.g., as indicated by the broken arrow II illustrated in FIG. 5). The operation 540 may be an example of the operation 440.

In 550, the background image updating module 340 may update the at least one background image stored in the first storage device 480 by designating a frame (e.g., first candidate image) of Y successive frames before the frame $F_N$ (i.e., frames $F_{N-Y}$ to $F_{N-1}$) or including the frame $F_N$ (i.e., frames $F_{N-Y+1}$ to $F_N$) as one of the at least one background image (e.g., first background image) for the next background filtering (e.g., by replacing the original background image with the frame). The Y successive frames may be determined as including no object of interest in the previously performed processes 500 and/or the currently performed process 500.

In some embodiments, the operation 522 may be performed during or after the operation 540. In some embodiments, the operations 522 and 540 may be combined into the same operation.

In some embodiments, the control module 350, or the background image updating module 340, may reset the condition parameter X as 0 upon the determination that the condition parameter X is more than the threshold Y.

In some embodiments, upon a determination that there is no object of interest in the frame $F_N$, the control module 350 may cause the candidate image updating module 350 to store the frame $F_N$ in the second storage device to update the at least one candidate image. The frame $F_N$ may be stored as a new candidate image or to replace a corresponding candidate image (e.g., the first candidate image). Then a next time the operation 550 is performed (e.g., in a process for processing the frame $F_{N+k}$, wherein k is a positive integer), the stored frame $F_N$ may be used to update the at least one background image stored in the first storage device 480.

In the process 500, when the frame $F_N$ is determined as including no object of interest, the at least one background image may not be directly updated based on the frame $F_N$. Instead, the image processing device 300 (or the control module 350) may count the frames determined as including no object of interest. When the condition parameter X representing the count is more than the threshold Y, i.e., at least Y successive frames are determined as including no object of interest, the at least one background image (e.g., the first background image) may be updated based at least in part on one frame of the Y successive frames, thereby obtaining at least one updated background image. The at least one updated background image may be used in a next background filtering operation (e.g., operation 530). The process 500 may have an enhanced performance toward an extraction of a long-time-still object of interest.

In some specific embodiments, the threshold Y may be obtained by Y=2Z, wherein Z is a positive integer. The frame of the Y successive frames that is designated as one of the at least one background image may be the nth frame of the Y successive frames (e.g., the frame $F_{N-Y+z}$ or $F_{N-Y+2-1}$). As the frames before and after the Zth frame of the Y successive frames are all determined as including no object of interest. The possibility that there is an object of interest in the Zth frame of the Y successive frames that is not detected by the object detection module 320 may be reduced, thereby further improving the background filtering performance toward the long-time-still objects.

It is noted that the above descriptions of the process 500 are only for demonstration purposes, and not intended to be limiting. It is understandable that after learning the major concept of the present disclosure, a person of ordinary skills in the art may alter the process 500 in an uncreative manner. For example, the operations above may be implemented in an order different from that illustrated in FIG. 5. One or more optional operations may be added to the flowcharts. One or more operations may be split or be combined. All such modifications are within the scope of the present disclosure.

Figure 6:
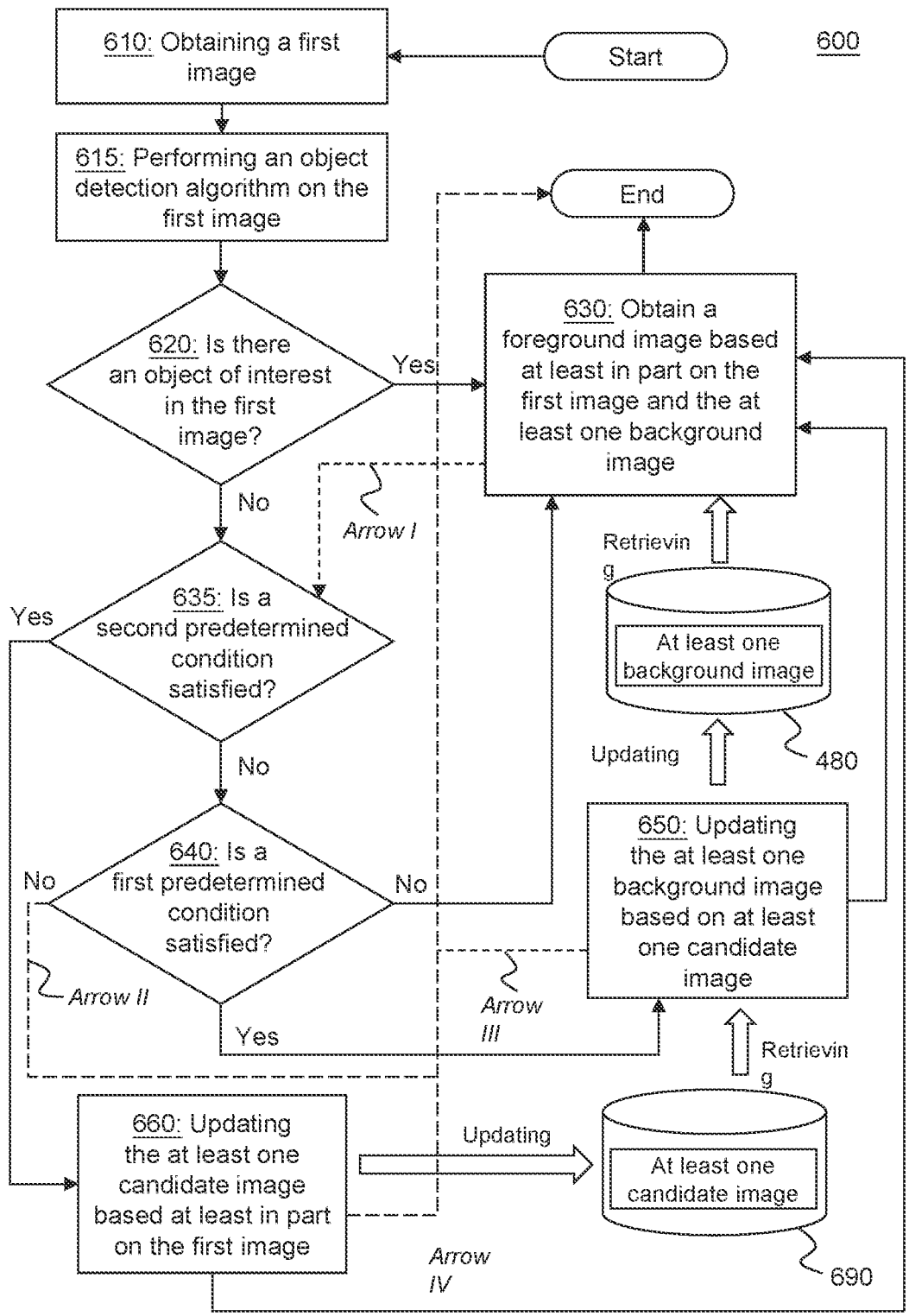
FIG. 6 is a flowchart illustrating an exemplary process for processing an image according to some embodiments of the present disclosure.

FIG. 6 is a flowchart illustrating an exemplary process 600 for processing an image according to some embodiments of the present disclosure. The process 600 may be implemented by the image processing device 300 illustrated in FIG. 3 for generating a foreground image of an image to be processed (first image) using at least one updatable background image. In some embodiments, the process 600 illustrated in FIG. 6 may be implemented in the image processing system 100 illustrated in FIG. 1 (e.g., by the image processing device 120). For example, the process 600 illustrated in FIG. 6 may be stored in a storage device (e.g., the storage device 140, the storage device 220, the ROM 230, the RAM 240) in the form of instructions, and invoked and/or executed by one or more processors (e.g., the processor 210) of the image processing device 120.

The process 600 may be an example of the process 400 illustrated in FIG. 4, and some descriptions of the process 600 and the operations thereof may be found in descriptions of FIG. 4. Compared to the process 400 illustrated in FIG. 4, the process 600 illustrated in FIG. 6 further provide example operations for updating the at least one background image. The at least one background image may be updated based on at least one candidate image that is also updatable. For example, the at least one candidate image may be updated based at least in part on the first image when a second predetermined condition is satisfied. It is noted that the process 600 is not intended to be limiting.

In 610, the image obtaining module 310 may obtain a first image of the video. In some embodiments, the image obtaining module 310 may further obtain at least one reference image associated with the first image. The operation 610 may be the same as or similar to the operation 410.

In 615, the object detection module 320 may perform an object detection algorithm on the first frame to detect one or more objects of interests in the first frame. The operation 615 may be the same as or similar to the operation 415.

In 620, the control module 350 may determine whether there is an object of interest in the first image based on the detection result of the object detection module 320. Upon a determination that there is an object of interest in the first image, the control module 350 may cause the foreground image module 330 to perform the operation 630. Upon a determination that there is no object of interest in the first image, the control module 350 may perform the operation 635. The operation 620 may be the same as or similar to the operation 420.

In 630, the foreground image module 330 may obtain a foreground image based at least in part on the first image and the at least one background image. For example, the foreground image module 330 may generate a difference image based at least in part on the first image and the at least one background image, and generate the foreground image based on the difference image. The foreground image module 330 may retrieve the at least one background image from the first storage device 480. In some embodiments, the foreground image module 330 may obtain the foreground image (or the difference image) based further on the at least one reference image obtained by the image obtaining module 310. The operation 630 may be the same as or similar to the operation 430.

In some embodiments, optionally, the process 600 may also include a false-positive-result correction (e.g., as indicated by the broken arrow I in FIG. 6). The foreground image module 330 may output a parameter indicating that there is no object of interest in the first image. The parameter may be received by the foreground image control module 350, causing the foreground image control module 350 to perform the operation 635. The false-positive-result correction may be performed when the object detection module 320 detects one or more objects of interest in the first image in the operation 615 but the foreground image module 330 determines that there is no object of interest in the first image.

In 635, the control module 350 may determine whether a second predetermined condition is satisfied. Upon a determination that the second predetermined condition is satisfied, the control module 350 may cause the candidate image updating module 360 to perform the operation 660. Upon a determination that the second predetermined condition is not satisfied, the control module 350 may perform the operation 640.

In 640, the control module 350 may determine whether a first predetermined condition is satisfied. Upon a determination that the first predetermined condition is satisfied, the control module 350 may cause the background image updating module 340 to perform the operation 650. Upon a determination that the first predetermined condition is not satisfied, the control module 350 may cause the foreground image module 330 to perform the operation 630. The operation 640 may be the same as or similar to the operation 440.

In the process 600, the at least one background image may be updated based on at least one candidate image. The at least one candidate image may also be updatable. When it is determined that the first image includes no object of interest in the operation 620 (or the operation 630), the control module 350 may cause the candidate image updating module 360 to perform the operation 660 to update the at least one candidate image. The second predetermined condition may be an additional condition for obtaining or updating the at least one candidate image, and may be set according to actual needs. It is noted that the second predetermined condition is not necessary, and the operation 635 may be removed from the process 600. For example, when the control module 350 determines that there is no object of interest in the first image, the control module 350 may cause the candidate image updating module 360 to update the at least one candidate image directly.

In some embodiments, the second predetermined condition may also be based on one or more condition parameters. The first predetermined condition and the second predetermined condition may be based on the same condition parameter(s) or different condition parameters. The one or more condition parameters associated with the first predetermined condition and/or the second predetermined condition may be updated (e.g., by the control module 350) before, during, or after the process 600. Correspondingly, the process 600 may further include operations for updating the one or more condition parameters. In different embodiments of the present disclosure, the first predetermined condition, the second predetermined condition, and/or the one or more condition parameters may take different forms.

In some specific embodiments, the first image may be an Nth frame of a video, wherein N is an integer above 1. The first predetermined condition and the second predetermined condition may be both associated with the aforementioned condition parameter X that is related to a count of successive frames determined as including no object of interest before the Nth frame in the video. Upon the determination that there is no object of interest in the first image, the control module 350 may update the condition parameter X. For example, the control module 350 may plus the condition parameter X by 1. Upon the determination that there is an object of interest in the first image, the control module 350 may reset the condition parameter X to its initial value (e.g., 0). Upon the determination that the first predetermined condition is satisfied, the control module 350 may also reset the condition parameter X to its initial value (e.g., 0). The first predetermined condition and the second predetermined condition may be both based on the condition parameter X. For example, the first predetermined condition may include that the condition parameter X is more than a threshold Y, and the second predetermined condition may include that the condition parameter X is equal to another threshold Z. The threshold Z may be less than the threshold Y. When the condition parameter X is more than the threshold Y, the control module 350 may cause the background image updating module 340 to perform the operation 650 to update the at least one background image. When the condition parameter X is equal to the threshold Z, the control module 350 may cause the candidate image updating module 360 to perform the operation 660 to update the at least one candidate image. Otherwise, the control module 350 may skip the operations 650 and 660.

In some specific embodiments, threshold Y and the threshold Z may satisfy that Y=2Z.

In 650, the background image updating module 340 may update the at least one background image stored in the first storage device 480 based on the at least one candidate image stored in a second storage device 690. The background image updating module 340 may retrieve the at least one candidate image from the second storage device 690, and update, based on the at least one candidate image, the at least one background image in the first storage device 480. The operation 650 may be the same as or similar to the operation 450.

The second storage device 690 may be configured to store the at least one candidate image for updating the at least one background image. The second storage device 690 may be the storage device 140, the storage device 220, the RAM 240, the first storage device 480, or another storage device. The at least one candidate image stored in the first storage device 480 may be updatable. When the at least one candidate image is updated before the operation 650, the background image updating module 340 may retrieve the updated candidate image(s) for updating the at least one background image.

In 660, the candidate image updating module 360 may update the at least one candidate image based at least in part on the first image obtained in the current process 600, thereby obtaining at least one updated candidate image. In some embodiments, the candidate image updating module 360 may update the at least one candidate image based further on the at least one reference image obtained by the image obtaining module in the operation 610. After the at least one candidate image in the second storage device 480 is updated, in a next operation for updating the at least one background image (e.g., the operation 650 of the next process 600, another operation other than the operation 650), the at least one background image may be updated based on the at least one updated candidate image.

The approach for updating the at least one candidate image based at least in part on the first image may be the same as or similar to the approach for updating the at least one background image based on the at least one candidate image.

In some embodiments, as described in connection with FIG. 4, the at least one background image may include a first background image corresponding to the first image, and the at least one candidate image may also include a first candidate image corresponding to the first background image. The candidate image updating module 360 may update the first candidate image based at least in part on the first image. Exemplary approaches are described as following, which are merely for demonstration purposes and not intended to be limiting.

In some embodiments, the candidate image updating module 360 may adopt an image replacement approach for updating the first candidate image. The candidate image updating module 360 may directly replace the original first candidate image with the first image. The first image of the current process 600 may serve as the updated first candidate image and be used for a next background updating operation (e.g., the operation 650 of the next process 600).

In some embodiments, the candidate image updating module 360 may adopt an image increment approach for updating the first candidate image. The candidate image updating module 360 may generate an updated first candidate image based on the original first candidate image and the first image. For example, the updated first candidate image may be a mean or a weighted mean of the original first candidate image and the first image.

In some embodiments, the candidate image updating module 360 may adopt a local increment approach for updating the first candidate image. The candidate image updating module 360 may obtain a candidate difference image based on the original first candidate image and the first image. The candidate difference image may represent a difference between the original first candidate image and the first image. The process for generating the candidate difference image may be the same as or similar to the process for generating a background difference image. Based on the candidate difference image, the candidate image updating module 360 may modify the original first candidate image to generate the updated first candidate image, e.g., via a process similar to the process for generating the updated first background image based on the background difference image.

In some embodiments, the candidate image updating module 360 may adopt a model update approach for updating the first candidate image. The candidate image updating module 360 may use a model for generating the original first candidate image. Then to update the first candidate image, the candidate image updating module 360 may update the model based at least in part on the first image, and use the updated model to generate a new candidate image as the updated candidate image. For example, the model may be a Gaussian model, a Gaussian mixture model, a machine learning model (e.g., a convolutional neural network (CNN) based model), or the like, or a combination thereof.

In some embodiments, in the operation 630, the foreground image module 330 may generate the foreground image based on the first image and the first background image. No reference image is involved in the generation of the foreground image. Correspondingly, the at least one candidate image may only include the first candidate image, and the candidate image updating module 360 may only need to update the first candidate image.

In some embodiments, in the operation 630, the foreground image module 330 may generate the foreground image based further on at least one reference image, and the at least one background image may include the first background image and at least one second background image corresponding to the at least one reference image. Correspondingly, the at least one candidate image may include the first candidate image and at least one second candidate image corresponding to the at least one second background image (or the at least one reference image). The candidate image updating module 360 may update each of the at least one second candidate image based at least in part on the corresponding reference image. The above provided approaches (e.g., the image replacement approach, the image increment approach, the local increment approach, the model update approach) or any other approach for updating the first candidate image may also be adopted for updating each of the at least one second candidate image.

The approach for updating the second candidate image may be the same as, similar to, or different from the approach for updating the first candidate image. For example, the approach for updating the second candidate image may be the image replacement approach, and the approach for updating the first candidate image may also be the image replacement approach, or be another approach such as the image increment approach. When the at least one second candidate image includes a second candidate image A and a second candidate image B, the approach for updating the second candidate image A may be the same as, similar to, or different from the approach for updating the second candidate image B.

The approach(es) for updating the at least one candidate image in the operation 660 may be the same as, similar to, or different from the approach(s) for updating the at least one background image in the operation 650. Take the update of the first candidate image and the update of the first background image as an example. The approach for updating the first candidate image may be the image replacement approach. The approach for updating the first background image may also be the image replacement approach, or be another approach such as the model update approach or the image increment approach.

In some embodiments, the first image and the at least one reference image may be sub-images of a combined image, and the first background image and the at least one second background image may also be sub-images of a combined background image. Correspondingly, the first candidate image and the at least one second candidate image may also be sub-images of a combined candidate image.

After the operation 650 and/or the operation 660, the foreground image module 330 may perform the operation 630 to generate a foreground image of the first image.

It is noted that performing the operation 630 after the operation 660, the operation 650, or the operation 640 (when the first determination condition is not satisfied) is not necessary. In some embodiments, upon a determination that the first predetermined condition is not satisfied, instead of causing the foreground image module 330 to perform the operation 630, the control module 350 may skip the operation 630 and end the process 600, as indicated by the broken arrow II illustrated in FIG. 6. Alternatively or additionally, after the operation 650 or the operation 660 is performed, the operation 630 may also be skipped and the process 600 may be ended, as indicated by the broken arrow III and the broken arrow IV in FIG. 6 (which are partially overlapped with the broken arrow II illustrated in FIG. 6). The choice for implementing the process 600 may be made according to the actual needs, the application field of the process 600, and/or the performance of the object detection algorithm adopted by the object detection module 320, etc.

In some embodiments, when the operation 630 is performed after the operation 640, 650, or 660, the foreground image module 330 may output a blank image as the foreground image to reduce the computation burden and the time cost of the process 600.

In some embodiments, if the false-positive-result correction (e.g., indicated by the broken arrow I in FIG. 6) has been performed, then after the operation 640, 650, or 660, the operation 630 may be skipped and the process 600 may be ended (e.g., indicated by the broken arrows II, III, an IV in FIG. 6), so as to prevent an endless loop.

In some embodiments, the second predetermined condition may be a precondition of the first predetermined condition. Then in the operation 635, upon a determination that the second predetermined condition is not satisfied, instead of performing the operation 640, the control module 350 may cause the foreground image module 330 to perform the operation 630, or end the process 600 without generating a foreground image.

In some embodiments, no matter the determination result of the operation 635, the control module 350 may perform the operation 640.

In some embodiments, the operation 640 may be performed before the operation 635. For example, upon a determination that there is no object of interest in the first image in the operation 620 (or in the operation 630), the control module 350 may perform the operation 640 instead of the operation 635. Upon a determination that the first predetermined condition is not satisfied in the operation 640, the control module 350 may perform the operation 635. In some specific embodiments, no matter the determination result of the operation 640, the control module 350 may perform the operation 635.

In some embodiments, the image processing device 300 may repeat the process 600 to process a pre-captured video.

In some embodiments, the image processing device 300 may perform the process 600 in real time.

It is noted that the above descriptions of the process 600 are only for demonstration purposes, and not intended to be limiting. It is understandable that after learning the major concept of the present disclosure, a person of ordinary skills in the art may alter the process 600 in an uncreative manner. For example, the operations above may be implemented in an order different from that illustrated in FIG. 6. One or more optional operations may be added to the flowcharts. One or more operations may be split or be combined. All such modifications are within the scope of the present disclosure.

Figure 7:
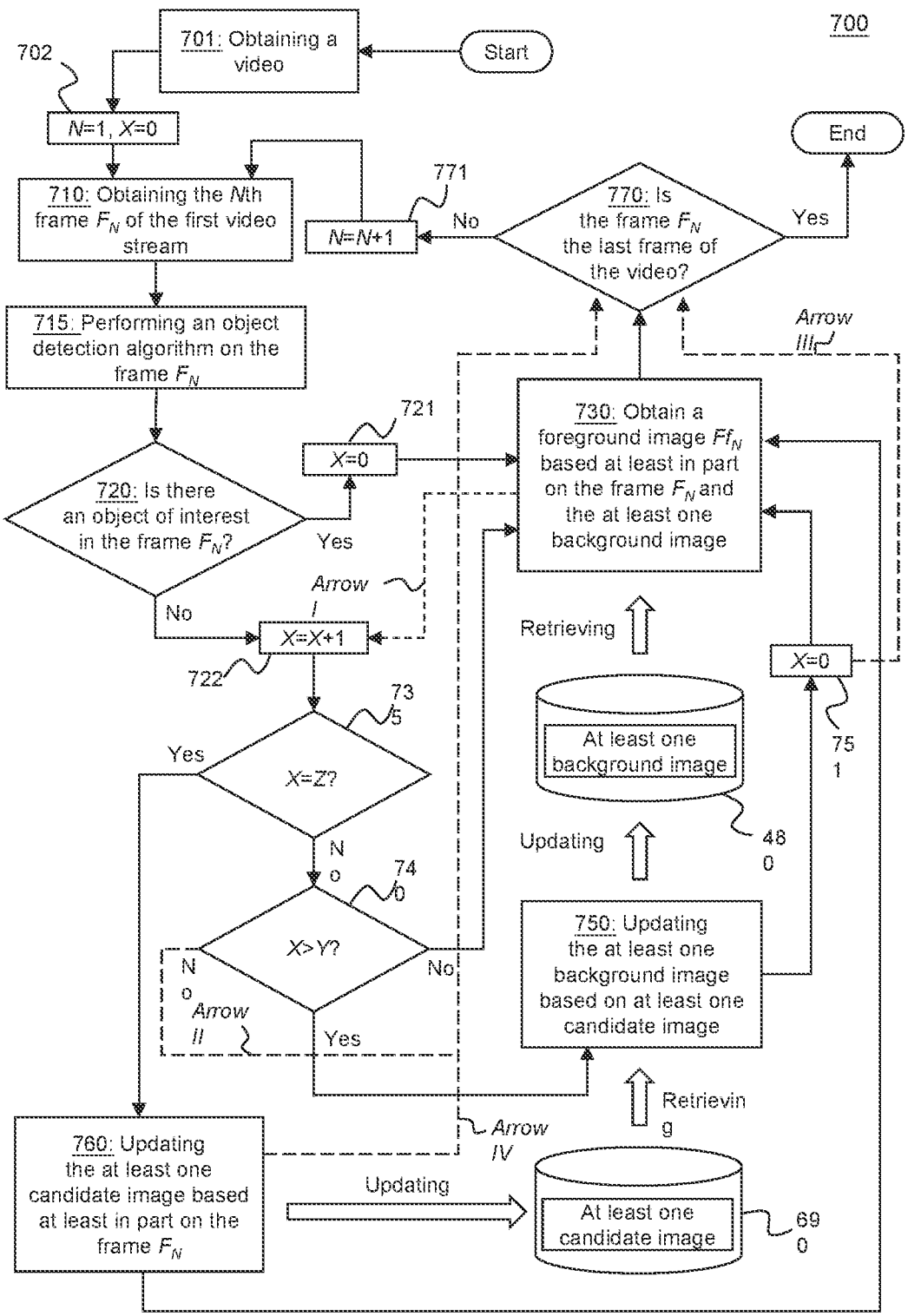
FIG. 7 is a flowchart illustrating an exemplary process for processing an image according to some embodiments of the present disclosure.

FIG. 7 is a flowchart illustrating an exemplary process 700 for processing an image according to some embodiments of the present disclosure. The process 700 may be implemented by the image processing device 300 illustrated in FIG. 3 for performing a background filtering (or foreground detection) on a video. In some embodiments, the process 700 illustrated in FIG. 7 may be implemented in the image processing system 100 illustrated in FIG. 1 (e.g., by the image processing device 120). For example, the process 700 illustrated in FIG. 7 may be stored in a storage device (e.g., the storage device 140, the storage device 220, the ROM 230, the RAM 240) in the form of instructions, and invoked and/or executed by one or more processors (e.g., the processor 210) of the image processing device 120.

The process 700 may be an example of the implementation of the process 400, 500, or 600 to process a video. The process 700 may further include operations related to video processing. The first predetermined condition and the second predetermined condition in the process 700 may be both based on the aforementioned condition parameter X. It is noted that the process 700 is provided merely for demonstration purposes, and not intended to be limiting.

In 701, the image processing device 300 (or the image obtaining module 310) may obtain a video to be processed. The video may be a video file or a video stream generated by the image capturing mechanism 110 or stored (or buffered) in a storage device (e.g., the storage device 140, the storage device 220, the RAM 240, the first storage device 480, the second storage device 690). The image processing device 300 may obtain the video from the corresponding video source.

In 702, the control module 350 may initiate parameters associated with the processing of the video to their initial values. For example, the image processing device 300 may initiate a frame indicator N, and a condition parameter X. The initiate values of the frame indicator N and the condition parameter X may be 1 and 0, respectively. The frame indicator N may be an integer equal to or more than 1, and may be used to indicate the current frame to be processed, i.e., the Nth frame $F_N$. The condition parameter X may be used for determining whether to update the at least one background image for performing the background filtering on the video and whether to update the at least one candidate image for updating the at least one background image. The condition parameter X may be related to a count of successive frames determined as including no object of interest before the frame $F_N$ in the video. It is noted that the frame indicator N and/or the condition parameter X may take other forms in another embodiment of the present disclosure.

In 710, the image obtaining module 310 may obtain an Nth frame $F_N$ (first image) of the video. In some embodiments, the image obtaining module 310 may further obtain at least one reference image associated with the frame $F_N$. For example, the frame $F_N$ may be a color image, and the at least one reference image may include a corresponding depth image. The operation 510 may be the same as or similar to the operation 410/510/610.

In 715, the object detection module 320 may perform an object detection algorithm on the frame $F_N$ to detect one or more objects of interests in the frame $F_N$. The operation 715 may be the same as or similar to the operation 415/515/615. For different types of objects of interest, the object detection algorithm adopted by the object detection module 320 may be different. The object detection algorithm adopted by the object detection module 320 is not limited in the present disclosure.

In some embodiments, by performing the object detection algorithm on the frame $F_N$, one or more object boxes may be obtained. Each of the one or more object boxes may correspond to at least one detected object of interest. When multiple objects of interest are detected in the frame $F_N$, multiple object boxes may be obtained via the operation 715.

In 720, the control module 350 may determine whether there is an object of interest in the frame $F_N$ based on the detection result of the object detection module 320. The operation 720 may be the same as or similar to the operation 420/520/620. Upon a determination that there is an object of interest in the frame $F_N$, the control module 350 may perform the operation 721. Upon a determination that there is no object of interest in the frame $F_N$, the control module 350 may perform the operation 722.

In 721, the control module 350 may reset the condition parameter X as 0, and cause the foreground image module 330 to perform the operation 730.

In 730, the foreground image module 330 may obtain a foreground image $Ff_N$ based at least in part on the frame $F_N$ and the at least one background image The foreground image module 330 may retrieve the at least one background image from the first storage device 480. In some embodiments, the foreground image module 330 may obtain the foreground image $Ff_N$ based further on the at least one reference image obtained by the image obtaining module 310. The operation 730 may be the same as or similar to the operation 430/530/630.

In some embodiments, the operation 721 may be performed by the foreground image module 330 instead of the control module 350.

In some embodiments, optionally, the process 700 may also include a false-positive-result correction (e.g., as indicated by the broken arrow I in FIG. 7). The foreground image module 330 may output a parameter indicating that there is no object of interest in the frame $F_N$. The parameter may be received by the foreground image control module 350, causing the foreground image control module 350 to perform the operation 722. The false-positive-result correction may be performed when the object detection module 320 detects one or more objects of interest in the frame $F_N$ in the operation 615 but the foreground image module 330 determines that there is no object of interest in the frame $F_N$. When the false-positive-result correction is performed, the condition parameter X may be restored to its value before the execution of the operation 721.

In 722, the control module 350 may plus the condition parameter X by 1, and then perform the operation 735.

In 735, the control module 350 may determine whether the condition parameter X is equal to a predetermined threshold Z (second predetermined condition). Upon a determination that the condition parameter X is equal to the threshold Z, the control module 350 may cause the candidate image updating module 360 to perform the operation 760. Upon a determination that the condition parameter X is not equal to the threshold Z, the control module 350 may perform the operation 740. The operation 735 may be an example of the operation 635.

In 740, the control module 350 may determine whether the condition parameter X is more than a predetermined threshold Y (first predetermined condition), wherein the threshold Y is more than the threshold Z. Upon a determination that the condition parameter X is more than the threshold Y, the control module 350 may cause the background image updating module 340 to perform the operation 750. Upon a determination that the condition parameter X is equal to or less than the threshold Y, the control module 350 may cause the foreground image module 330 to perform the operation 730 with the non-updated at least one reference image. Alternatively, the control module 350 may perform the operation 770 (e.g., as indicated by the broken arrow II illustrated in FIG. 7). The operation 740 may be an example of the operation 440/640.

In some specific embodiments, the threshold Y and the threshold Z may satisfy that Y=2Z.

In 750, the background image updating module 340 may update the at least one background image stored in the first storage device 480 based on the at least one candidate image stored in the second storage device 690. The background image updating module 340 may retrieve the at least one candidate image from the second storage device 690, and update, based on the at least one candidate image, the at least one background image in the first storage device 480. The operation 750 may be the same as or similar to the operation 450/550/650.

After the operation 750, the operation 751 may be performed. In 751, the control module 350 may reset the condition parameter X as 0. In some embodiments, the operation 751 may be performed before the operation 750 and after the operation 740 (when the condition parameter X is equal to or less than the threshold Y). In some embodiments, the operation 751 may be performed during the operation 750. In some embodiments, the operation 751 may be performed by the background image updating module 340.

In 760, the candidate image updating module 360 may update the at least one candidate image based at least in part on the frame $F_N$, thereby obtaining at least one updated candidate image. In some embodiments, the candidate image updating module 360 may update the at least one candidate image based further on the at least one reference image obtained by the image obtaining module in the operation 710. After the at least one candidate image in the second storage device 480 is updated, in a next operation for updating the at least one background image (e.g., the next time the operation 750 is performed), the at least one background image may be updated based on the at least one updated candidate image. The operation 760 may be the same as or similar to the operation 660.

After the operation 751 and/or the operation 760, the foreground image module 330 may perform the operation 630 to generate the foreground image $Ff_N$ of the frame $F_N$.

After the operation 730, the operation 770 may be performed. In 770, the control module 350 may determine whether the frame $F_N$ is the last frame of the video. Upon a determination that the frame $F_N$ is the last frame of the video, the control module 350 may end the process 700. Upon a determination that the frame $F_N$ is not the last frame of the video, the control module 350 may perform the operation 771 to plus the frame indicator N by 1. Then the control module 350 may cause the image obtaining module to perform the operation 710 again, so as to process the frame $F_{N+1}$ of the video.

It is noted that performing the operation 730 after the operation 760, the operation 751, or the operation 740 (when the condition parameter X is equal to or less than the threshold Y) is not necessary. In some embodiments, upon a determination that the condition parameter X is equal to or less than the threshold Y, instead of causing the foreground image module 330 to perform the operation 730, the control module 350 may skip the operation 730 and perform the operation 770, as indicated by the broken arrow II illustrated in FIG. 7. Alternatively or additionally, after the operation 751 or the operation 760 is performed, the operation 730 may also be skipped and the operation 770 may be performed, as indicated by the broken arrow III and the broken arrow IV in FIG. 7 (the broken arrow IV is partially overlapped with the broken arrow II illustrated in FIG. 7). The choice for implementing the process 700 may be made according to the actual needs, the application field of the process 700, and/or the performance of the object detection algorithm adopted by the object detection module 320, etc.

In some embodiments, when the operation 730 is performed after the operation 740, 751, or 760, the foreground image module 330 may output a blank image as the foreground image $Ff_N$ to reduce the computation burden and the time cost of the process 700.

In some embodiments, if the false-positive-result correction (e.g., indicated by the broken arrow I in FIG. 7) has been performed, then after the operation 740, 751, or 760, the operation 730 may be skipped and the operation 770 may be performed (e.g., indicated by the broken arrows II, III, an IV in FIG. 7), so as to prevent an endless loop.

In some embodiments, no matter the determination result of the operation 735, the control module 350 may perform the operation 740.

In some embodiments, the operation 740 may be performed before the operation 735. For example, after the operation 722, the control module 350 may perform the operation 740 instead of the operation 735. Upon a determination that the condition parameter X is equal to or less than the threshold Y in the operation 740, the control module 350 may perform the operation 735. In some specific embodiments, no matter the determination result of the operation 740, the control module 350 may perform the operation 735.

In some embodiments, performing the object detection on each frame of the video is not necessary. For example, when it is determined that there is an object of interest in a frame of the video (e.g., frame $F_N$), the possibility that the next frame (e.g., frame $F_{N+1}$) also includes an object of interest is relatively high; when it is determined that there is no object of interest in a frame of the video (e.g., frame $F_N$), the possibility that the next frame (e.g., frame $F_{N+1}$) includes an object of interest is relatively low. Therefore, the image processing device 300 may selectively perform the operation 715, so as to further reduce the time cost and the computation burden of the process 700. For example, the control module 350 may determine whether a fourth predetermined condition is satisfied before the operation 715 (e.g., after the operation 710 or after the operation 771). Upon a determination that the fourth predetermined condition is satisfied, the control module 350 may cause the object detection module 320 to perform the operation 715 after the operation 710. Upon a determination that the fourth predetermined condition is not satisfied, the control module 350 may skip the operation 715 and use the last object detection result in the operation 720, or directly perform the operation 730 after the operation 710 to generate a corresponding foreground image. The above operation may also be included in the process 400, 500, or 600. For example, in the process 400, the control module 350 may perform the above operation before the operation 415 or 410. Upon a determination that the fourth predetermined condition is satisfied, the control module 350 may cause the object detection module 320 to perform the operation 415 after the operation 410. Upon a determination that the fourth predetermined condition is not satisfied, the control module 350 may skip the operation 415 and use the object detection result in the last process 400 in the current operation 420, or directly perform the operation 430. The process 500 or 600 may be adjusted similarly.

In some embodiments, the foreground images obtained by the image processing device 300 by processing the video via the process 700 may be in the form of a video (a video stream or a video file) or a plurality of videos. Such a video may be referred to as a foreground video. The foreground video may be further processed and/or analyzed by the image processing device 300 or another device of the image processing system 100 (not shown) for, e.g., identity recognition, behavior analysis, etc.

In some embodiments, the image processing device 300 may perform the process 700 in real time. For example, frames of the video (e.g., a video stream) may be buffered in a queue, which may be processed by the image processing device 300 via the process 700. The image processing device 300 may process the frames buffered in the queue via the process 700. In some embodiments, the image processing device 300 may selectively process the frames buffered in the queue. In some embodiments, frames of the obtained foreground video (e.g., a video stream) may be further processed and/or analyzed in real time, so as to detect currently occurring events (e.g., criminal activity, emergency, accident) and/or perform a real-time identity recognition.

It is noted that the above descriptions of the process 700 are only for demonstration purposes, and not intended to be limiting. It is understandable that after learning the major concept of the present disclosure, a person of ordinary skills in the art may alter the process 700 in an uncreative manner. For example, the operations above may be implemented in an order different from that illustrated in FIG. 7. One or more optional operations may be added to the flowcharts. One or more operations may be split or be combined. All such modifications are within the scope of the present disclosure.

Figure 8:
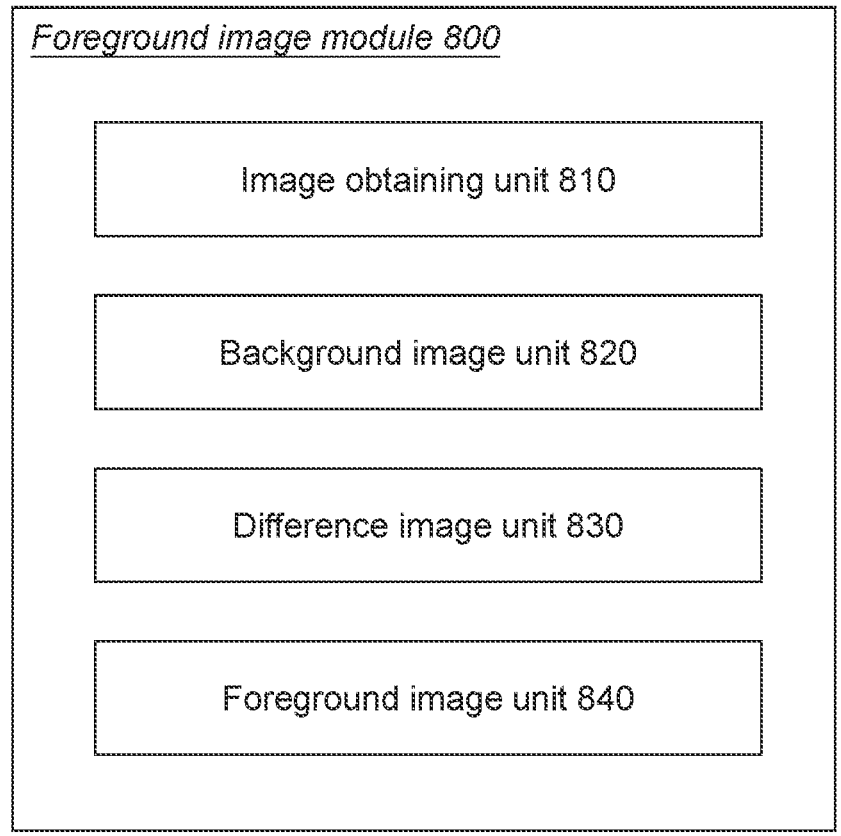
FIG. 8 is a schematic diagram illustrating an exemplary foreground image module according to some embodiments of the present disclosure.

FIG. 8 is a schematic diagram illustrating an exemplary foreground image module 800 according to some embodiments of the present disclosure. The foreground image module 800 may be an example of the foreground image module 330 illustrated in FIG. 3, and be configured to generate a foreground image in the operation 430, 530, 630, or 730 illustrated in FIGS. 4 to 7 respectively. The foreground image module 800 may also be included in another device, and be configured to obtain a foreground image independently from the process 400, 500, 600, or 700. The foreground image module 800 may include an image obtaining unit 810, a background image unit 820, a difference image unit 830, and a foreground image unit 840.

The image obtaining unit 810 may be configured to obtain a first image and at least one reference image. The at least one reference image may be associated with the first image. The first image and the at least one reference image represent different aspects of substantially a same shooting scene.

The background image unit 820 may be configured to obtain a plurality of background images. The plurality of background images may include a first background image corresponding to the first image. The plurality of background image may also include a second background image corresponding to each of the at least one reference image, thereby including at least one second background image.

The difference image unit 830 may be configured to generate a difference image based on the first image, the at least one reference image, and the plurality of background images. The difference image may include one or more difference image regions. Each of the one or more difference image regions may represent a difference between a corresponding image region of the first image and a corresponding image region of the first background image, or a difference between a corresponding image region of one of the at least one reference image and a corresponding image region of the corresponding second background image.

The foreground image unit 840 may be configured to generate a foreground image based on the first image and the difference image.

The functions and operations of the units of the foreground image module 800 may be further described in connection with FIGS. 8 to 11.

It is noted that the above descriptions about the image processing device 300 are only for illustration purposes, and not intended to limit the present disclosure. It is understood that after learning the major concept and the mechanism of the present disclosure, a person of ordinary skill in the art may alter the image processing device 300 in an uncreative manner. The alteration may include combining and/or splitting modules, adding or removing optional modules, etc. The division of the modules of the image processing device 300 is merely based on a logical delineation. Other division formats may also be adopted. All such modifications are within the protection scope of the present disclosure.

Figure 9:
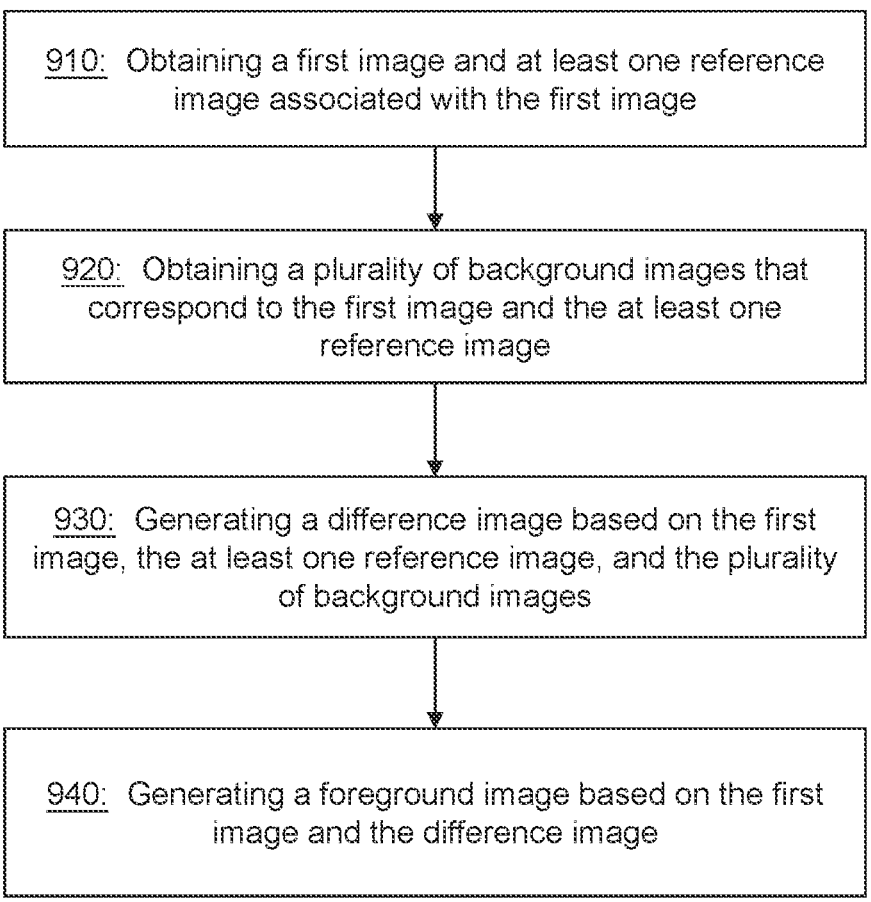
FIG. 9 is a flowchart illustrating an exemplary process for generating a foreground image according to some embodiments of the present disclosure.

FIG. 9 is a flowchart illustrating an exemplary process 900 for generating a foreground image according to some embodiments of the present disclosure. The process 900 may be implemented by the foreground image module 800 illustrated in FIG. 8. In some embodiments, the process 900 illustrated in FIG. 9 may be implemented in the image processing system 100 illustrated in FIG. 1 (e.g., by the image processing device 120). For example, the process 900 illustrated in FIG. 9 may be stored in a storage device (e.g., the storage device 140, the storage device 220, the ROM 230, the RAM 240) in the form of instructions, and invoked and/or executed by one or more processors (e.g., the processor 210) of the image processing device 120.

In some embodiments, the process 900 may be an example of the operation 430, 530, 630, or 730. However, it is understood that the process 900 can be implemented independently for generating a foreground image of an image to be processed (e.g., by the image processing device 300 or anther image processing device).

Some detailed information of the process 900 may also be found elsewhere in the present disclosure (e.g., FIGS. 4, 5, 6, and 7 and the descriptions thereof).

In 910, the image obtaining unit 810 may be configured obtain a first image and at least one reference image. The at least one reference image may be associated with the first image. The first image and the at least one reference image represent different aspects of substantially a same shooting scene. For example, the first image may be a color image, and the at least one reference image may include a depth image. In some embodiments, the first image may be a frame of a video. In some embodiments, the first image and the at least one reference image may be sub-images of a combined image.

In some embodiments, the process 900 may be performed to achieve the operation 430, 530, 630, or 730. The image obtaining unit 810 may obtain the first image and/or the at least one reference image form the image obtaining module 310, the object detection module 320, the control module 350, or a built-in storage device of the image processing device 300 where the first image and/or the at least one reference image is stored.

In some embodiments, the process 900 may be performed independently of the process 400, 500, 600, or 700. Then the operation 910 may be the same as or similar to the operation 410.

In 920, the background image unit 820 may be configured to obtain a plurality of background images that correspond to the first image and the at least one reference image. The plurality of background images may include a first background image corresponding to the first image. The plurality of background image may also include a second background image corresponding to each of the at least one reference image, thereby including at least one second background image. In some embodiments, the first background image and the at least one second background image may be sub-images of a combined background image.

In some embodiments, the process 900 may be performed to achieve the operation 430, 530, 630, or 730. The image obtaining unit 810 may obtain the plurality of background image from the first storage device 480.

In some embodiments, the process 900 may be performed independently of the process 400, 500, 600, or 700. Then the background image unit 820 may obtain the at least one second background image from the storage device 140, the storage device 220, the RAM 240, the first storage device 480, or any other local storage device or remote storage device.

In 930, the difference image unit 830 may generate a difference image based on the first image, the at least one reference image, and the plurality of background images. The difference image may include one or more difference image regions. The one or more difference image regions may together cover the whole difference image, or only a part of the difference image. For each of the one or more difference image regions, the difference image unit 830 may select images from the first image, the first background image, the at least one reference image, and the at least one second background image for generating the difference image regions. For example, the first image, the at least one reference image, and the at least one background image may form a plurality of image sets, which may correspond to different aspect of the shooting scene. Each of the plurality of image sets may include an image to be filtered and a corresponding background image. The image to be filtered may be the first image or one of the at least one reference image. For each difference image region, the difference image unit 830 may select a target image set from the plurality of image sets, and generate the difference image region based on the target image set. For example, from the image to be filtered of the target image set, the difference image unit 830 may retrieve an image region A corresponding to the difference image region; from the background image of the target image set, the difference image unit 830 may retrieve an image region B corresponding to the difference image region. The difference image unit 830 may then generate the difference image region by subtracting the image region B from the image region A.

Based on the selection result, each of the one or more difference image regions may represent a difference between a corresponding image region (first image region) of the first image and a corresponding image region (first background region) of the first background image, or a difference between a corresponding image region (second image region) of one of the at least one reference image and a corresponding image region (second background region) of the corresponding second background image. The generated difference image region(s) may be combined by the difference image unit 830 to form the whole difference image or at least a part thereof. Alternatively, the generated difference image region(s) may each be treated as an independent difference image, and the "difference image" including the difference image region(s) may be a collection of the difference image(s). The obtained independent difference image(s) may each be used to generate a corresponding foreground image.

Via such an approach, the difference image unit 830 may generate each difference image region of the difference image using an image set selected to improve the performance of the background filtering on the corresponding local portion of the first image, thereby improving the overall performance of the background filtering on the whole first image. For example, when a first object of interest and the background in the first image cannot be efficiently extracted according to a first aspect but can be efficiently extracted according to a second aspect, and a second object of interest and the background in the first image cannot be efficiently extracted according to the second aspect but can be efficiently extracted according to the first aspect, the difference image unit 830 can use the second aspect to extract the first object of interest and use the first aspect to extract the second object of interest, thereby improving the overall background filtering performance.

In some embodiments, the difference image region(s) may only cover a part of the difference image. To generate the other part(s) of the difference image, the difference image unit 830 may fill the other part(s) with pixels representing no difference (e.g., with a pixel value 0). Alternatively, the difference image unit 830 may directly subtract a corresponding portion of the first background image and the corresponding portion of the first image to generate the other part(s) of the difference image.

The positions of the one or more difference image regions in the difference image may be determined in various approaches. Exemplary approaches are provided as following, which are merely for demonstration purposes and not intended to be limiting.

In some embodiments, the positions of the one or more difference image regions may be determined according to a predetermined layout pattern. For example, the predetermined layout pattern may substantially equally divide the difference image into a plurality of equal-sized image blocks (or tiles), each of which may be a difference image region. According to the actual implementation, the image blocks at the edges of the difference image may have difference sizes compared to other image blocks. In some specific embodiments, according to the predetermined layout pattern, the plurality of image blocks may not be equally sized.

In some embodiments, the positions of the one or more difference image regions may correspond to one or more predetermined coordinate ranges, each of which is considered as having a greater chance to include an object of interest than other coordinate ranges in most images according to empirical practices.

In some embodiments, the one or more difference image regions may correspond to one or more detected regions (e.g., object boxes) in the first image. Each of the one or more detected regions may be determined as including at least one object of interest, and may be obtained by performing an object detection on the first image. Each of the one or more detected regions may be the first image region.

In some specific embodiments, the process 900 may be performed to achieve the operation 430, 530, 630, or 730. The object detection may be performed by the object detection module 320. The object detection module 320 may output one or more position parameters representing the position(s) of the obtained detected region(s) in the first image, which may also correspond to the position of the corresponding difference image region in the difference image.

In some specific embodiments, the process 900 may be performed independently of the process 400, 500, 600, or 700, and the foreground image module 800 may not be included in the image processing device 300. The foreground image module 800 may further include an object detection unit (not shown) for performing the object detection on the first image. The object detection unit may be the same as or similar to the object detection module 320.

In some embodiments, the selecting, from the plurality of image sets, the target image set may be based at least in part on one or more features of the first image region and the at least one second image region. The one or more features may represent a liability, accuracy, quality, performance, etc., of the image data included in the corresponding region for performing the background image filtering. For example, for each of the one or more difference image regions, the difference image unit 830 may: retrieve, from the first image, a first image region corresponding to the difference image region; retrieve, from each of the at least one reference image, a second image region corresponding to the difference image region, thereby obtaining at least one second image region; obtain one or more feature values based on the first image region and at least one second image region; and select, from the plurality of image sets, a target image set based on the one or more feature values.

In some embodiments, the plurality of image sets may include a first image set and a second image set, and the difference image unit 830 may select the target image set from the first image set and the second image set. The difference image unit 830 may determine whether a third predetermined condition is satisfied, and select the target image set based on the result of the determination. The third predetermined condition may be correlated to one or more features of the first image region and the at least one second image region.

In some embodiments, the plurality of image sets may only include the first image set and the second image set. Alternatively, the plurality of image sets may further include one or more other image sets. For example, the plurality of image sets may further include a third image set. The difference image unit 830 may first select a preliminary image set from the first image set and the third image set by determining whether a third predetermined condition A is satisfied. Based on the determination result, the difference image unit 830 may select, e.g., the first image set as the preliminary image set. Then the difference image unit 830 may select the target image set from the first image set and the second image set by determining whether a third predetermined condition B is satisfied. Based on the determination result, the difference image unit 830 may obtain the target image set. According to such an elimination manner, with a plurality of third predetermined conditions, the difference image unit 830 may select the target image set from three or more image sets.

Figure 10:
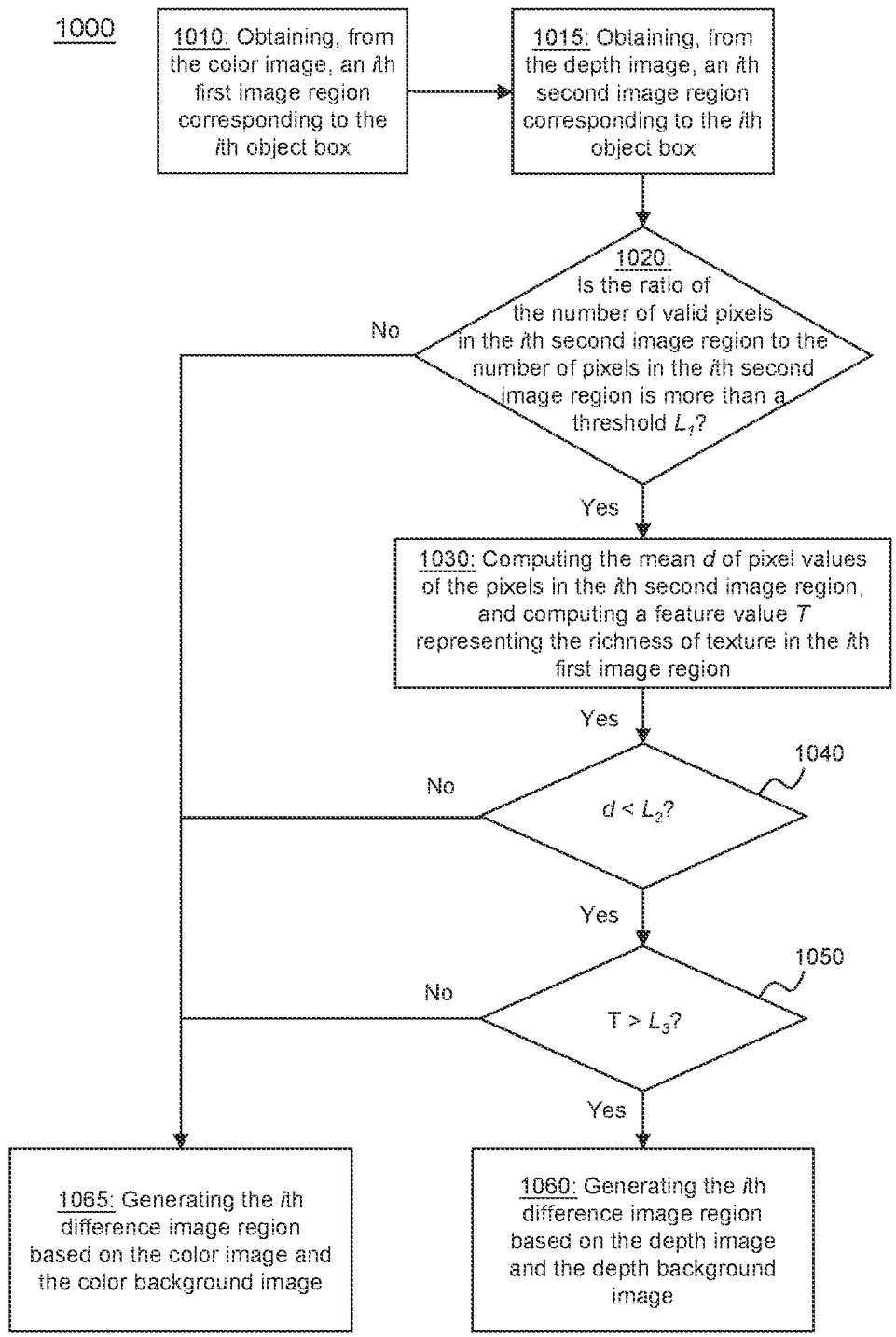
FIG. 10 is a flowchart illustrating an exemplary process 1000 for generating a foreground image according to some embodiments of the present disclosure.

In some embodiments, the first image may be a color image, and the at least one reference image may include a depth image. Correspondingly, the at least one background image may include a color background image and a depth background image corresponding to the color image and the depth image respectively. The color image and the color background image may form a first image set, and the depth image and the depth background image may form a second image set. The third predetermined condition for selecting the target image set (or a preliminary image set) from the above first image set and the above second image set may include, for example, at least one of the following conditions: the ratio of the number of valid pixels in the second image region of the depth image to the number of pixels in the second image region of the depth image is more than a first threshold; the mean of pixel values of the pixels in the second image region of the depth image is more than a second threshold; or the ratio of the number of pixels in the first image region of the color image whose gradient value is more than a third threshold to the number of pixels in the first image region is of the color image is more than a fourth threshold. Based on the determination result, the difference image unit 830 may select the target image set (or the preliminary image set) from the first image set and the second image set. Upon a determination that the third predetermined condition is satisfied, the difference image unit 830 select the second image set as the target image set (or the preliminary image set). Upon a determination that the third predetermined condition is not satisfied, the difference image unit 830 may select the first image set as the target image set (or the preliminary image set). An example of such a process is illustrated in FIG. 10.

In some embodiments, the selecting, from the plurality of image sets, the target image set may be based further on one or more features of the first background region and/or the second background region(s). The one or more features may also represent a liability, accuracy, quality, performance, etc., of the image data included in the corresponding region for performing the background image filtering. For example, for each of the one or more difference image regions, the difference image unit 830 may: retrieve, from the first image, a first image region corresponding to the difference image region; retrieve, from each of the at least one reference image, a second image region corresponding to the difference image region, thereby obtaining at least one second image region; retrieve, from the first background image, a first background region corresponding to the difference image region; retrieve, from each of the at least one second background image, a second background region corresponding to the difference image region, thereby obtaining at least one second background region; obtain one or more feature values based on the first image region, the at least one second image region, the first background region and at least one second background region; and select, from the plurality of image sets, a target image set based on the one or more feature values. In some embodiments, the selection may also be based on one or more third predetermined conditions.

In 940, the foreground image unit 840 may be configured to generate a foreground image based on the first image and the difference image. For example, the foreground image unit 840 may determine, for each pixel of at least a part of the difference image, whether the pixel is a foreground pixel or a background pixel. In some embodiments, the foreground image unit 840 may determine, for each pixel of at least a part of the difference image, whether the pixel is a foreground pixel or a background pixel based on one or more pixel values of the pixel and one or more corresponding thresholds. The foreground image unit 840 may determine whether a pixel is a foreground pixel or a background pixel based on a single pixel value of the pixel or based on multiple pixel values of the pixel. The foreground image unit 840 may generate the foreground image based at least in part on the first image and the pixels of the difference image determined as foreground pixels. Examples for generating the foreground image are provided as below, which are provided for demonstration purposes and not intended to be limiting.

In some embodiments, the foreground image unit 840 may directly use foreground pixels in the difference image for generating the foreground image. For example, the foreground image unit 840 may extract (e.g., copy, segment), from the first image, pixels corresponding to the foreground pixels in the difference image. The extracted pixels may form the foreground image.

In some embodiments, the foreground image unit 840 may count the total number of the foreground pixels in the difference image. When the total number of the foreground pixels is more than a predetermined threshold, the foreground image unit 840 may determine that there is at least one object of interest in the first image, and generate the foreground image using the foreground pixels in the difference image. For example, the foreground image may extract, from the first image, pixels corresponding to the foreground pixels in the difference image to form the foreground image. When the total number of the foreground pixels is less than or equal to the predetermined threshold, the foreground image unit 840 may determine that there is no object of interest in the first image. Under such a situation, the foreground image unit 840 may skip generating the foreground image using the foreground pixels in the difference image. In some embodiments, the foreground image unit 840 may generate a blank image as the foreground image when it is determined that there is no object of interest in the first image.

In some embodiments, for each of the one or more difference image regions, the foreground image unit 840 may count the number of the foreground pixels in the difference image region. When the number of the foreground pixels in the difference image region is more than a predetermined threshold, the foreground image unit 840 may determine that there is at least one object of interest in the difference image region, and generate a corresponding filtered image using the foreground pixels in the difference image region. For example, the foreground image unit 840 may extract, from the first image, pixels corresponding to the foreground pixels in the difference image region to form a corresponding filtered image. As another example, the foreground image unit 840 may extract, from the first image, all the pixels corresponding to the difference image region to form a corresponding filtered image. According to the actual needs, each filtered image may be a corresponding image region of the foreground image, or be treated as an independent foreground image. When the number of the foreground pixels in the difference image region is less than or equal to the predetermined threshold, the foreground image unit 840 may determine that there is no object of interest in the difference image region. Under such a situation, the foreground image unit 840 may skip generating the corresponding filtered image using the foreground pixels in the difference image. In some embodiments, the foreground image unit 840 may generate a blank image as the corresponding filtered image when it is determined that there is no object of interest in the first image.

After processing the one or more difference image regions, the foreground image unit 840 may obtain one or more filtered images, or obtain no filtered image. In some embodiments, the one or more difference image regions may be processed in parallel for generating the one or more filtered images, so as to reduce the time cost of the operation 950.

In some embodiments, the foreground image unit 840 may directly output one or more filtered images each of which is determined as including at least one object of interest as one or more corresponding foreground images. In some embodiments, the foreground image unit 840 may combine the obtained filtered image(s) to form a single foreground image and output the foreground image. In some embodiments, the foreground image unit 840 may combine the overlapped and/or adjacent filtered images of the obtained one or more filtered images to form one or more foreground images and output the one or more foreground images.

It is noted that the above descriptions of the process 900 are only for demonstration purposes, and not intended to be limiting. It is understandable that after learning the major concept of the present disclosure, a person of ordinary skills in the art may alter the process 900 in an uncreative manner. For example, the operations above may be implemented in an order different from that illustrated in FIG. 9. One or more optional operations may be added to the flowcharts. One or more operations may be split or be combined. All such modifications are within the scope of the present disclosure.

FIG. 10 is a flowchart illustrating an exemplary process 1000 for generating a foreground image according to some embodiments of the present disclosure. The process 1000 may be implemented by the foreground image module 800 illustrated in FIG. 8. In some embodiments, the process 1000 illustrated in FIG. 10 may be implemented in the image processing system 100 illustrated in FIG. 1 (e.g., by the image processing device 120). For example, the process 1000 illustrated in FIG. 10 may be stored in a storage device (e.g., the storage device 140, the storage device 220, the ROM 230, the RAM 240) in the form of instructions, and invoked and/or executed by one or more processors (e.g., the processor 210) of the image processing device 120.

The process 1000 may be an example of the operation 930. In the process 1000, the first image may be a color image and the at least one reference image may be a depth image. Correspondingly, the plurality of background image may include a color background image and a depth background image. The color image and the color background image may form a first image set. The depth image and the depth background image may form a second image set. In some embodiments, the color image and the reference image may be sub-images of a combined image, and the color background image and the depth background image may be sub-images of a combined background image.

The difference image for performing the background filtering may be generated based on the depth image, the color image, the color background image, and the depth background image. The one or more difference image regions of the difference image may correspond to one or more object boxes determined in the color image by performing an object detection on the color image. The object detection may be performed by the object detection module 320, or the object detection unit (not shown) of the foreground image module 800. The selection of the target image set for generating each difference image region may be based on a third predetermined condition including three sub-conditions: $C_1$, $C_2$, and $C_3$. When all the three sub-conditions are satisfied, the third predetermined condition may be satisfied, and the second image set may be selected for generating the corresponding difference image region. When one or more of the three sub-conditions are not satisfied, the third predetermined condition may not be satisfied, and the first image set may be selected for generating the corresponding difference image region.

The process 1000 may be described by taking the generation of an ith difference image region of the difference image as an example, wherein i may be an integer between 1 and the total number of the difference image region(s) in the difference image (or the total number of the object box(es) determined in the color image). By repeating the process 1000, all the difference image region(s) of the difference image may be generated accordingly. The difference image unit 830 may combine the obtained difference image region(s) as a single difference image. Alternatively, the difference image unit 830 may output the obtained difference image region(s) as independent difference image(s).

In 1110, the difference image unit 830 may obtain, from the color image, an ith first image region corresponding to the ith object box determined on the color image, wherein i may be an integer between 1 and the total number of object box(es) determined in the color image.

In 1115, the difference image unit 830 may obtain, from the depth image, an ith second image region corresponding to the ith object box.

In 1120, the difference image unit 830 may determine whether the sub-condation $C_1$ is satisfied. The sub-condition $C$; may be or include that the ratio of the number of valid pixels in the ith second image region to the number of pixels in the ith second image region is more than a threshold $L_1$. Upon a determination that the sub-condition $C_1$ is satisfied, the difference image unit 830 may perform the operation

1030. Upon a determination that the sub-condition $C_1$ is not satisfied, the difference image unit 830 may perform the operation 1065.

A pixel of the depth image may be a valid pixel or an invalid pixel. A valid pixel of a depth image may be a pixel have a pixel value representing a valid distance (valid depth value). An invalid pixel of a depth image may be a pixel have a pixel value representing an invalid distance (invalid depth value). For example, when the depth image is generated by a ranging component (e.g., the second sensor) of the image capturing mechanism 110, an invalid pixel may be obtained when the ranging component cannot measure or may mistakenly measure the distance between the reference point associated with the ranging component and the corresponding point of the shooting scene. As another example, when the depth image is generated based on two images using a stereo triangulation technique, the invalid pixel may be obtained when the matching of the corresponding pixels in the two images is failed. As yet another example, a pixel corresponding to a region that has no or little texture (e.g., a region having a texture richness lower than a threshold) may be regarded as an invalid pixel. In some embodiments, an invalid pixel in the depth image may be assigned with a negative depth value (e.g., $-1$, $-2$, $-3$, or the like).

In 1030, the difference image unit 830 may compute the mean d of pixel values of the pixels in the ith second image region, and compute a feature value T representing a richness of texture in the ith first image region.

The mean d may be obtained by dividing the sum of the pixel values of all the valid pixels in the ith second image region by the total number of the valid pixels in the ith second image region. When the pixel value of an invalid pixel is 0, the mean d may also be obtained by dividing the sum of the pixel values of all the pixels in the ith second image region by the total number of the valid pixels in the ith second image region.

As used herein, the texture may measure the grayscale difference of the pixels in a given image region (e.g., the ith first image region). The richer the texture, the larger the grayscale difference of the image pixels in the given image region. In some embodiments, as the gradient of a given image region may also reflect the grayscale difference of the pixels in the given image region, the difference image unit 830 may use the gradient to represent the richness of texture. Correspondingly, the feature value T may be obtained by: obtaining the gradient value of each pixel in the ith first image region by operating the sobel operator on the ith first image region; and computing the ratio of the number of pixels in the ith first image region of the color image whose gradient value is more than a predetermined threshold G to the number of pixels in the ith first image region. Such a ratio may be used as the feature value T for representing the richness of the texture in the ith first image region. The larger the feature value T, the richer the texture in the ith first image region, and the more reliable the depth information in the ith second image region. For example, the depth image may be obtained based on two images using a stereo triangulation technique. The richer the texture, the more accurate the determined depth information.

In 1040, the difference image unit 830 may determine whether the sub-condation $C_2$ is satisfied. The sub-condition $C_2$ may be or include that the mean d is less than a threshold $L_2$. Upon a determination that the sub-condition $C_2$ is satisfied, the difference image unit 830 may perform the operation 1050. Upon a determination that the sub-condition $C_2$ is not satisfied, the difference image unit 830 may perform the operation 1065.

In 1050, the difference image unit 830 may determine whether the sub-condation $C_3$ is satisfied. The sub-condition $C_3$ may be or include that the feature value T is more than a threshold $L_3$. Upon a determination that the sub-condition $C_3$ is satisfied, the difference image unit 830 may perform the operation 1060. Upon a determination that the sub-condition $C_3$ is not satisfied, the difference image unit 830 may perform the operation 1065.

In different embodiments, the operation 1040 may be performed before, during, or after the operation 1050. In some embodiments, the operation 1040 and the operation 1050 may be performed concurrently.

In 1060, the second image set may be selected as the target image set, and the difference image unit 830 may obtain the ith difference image region based on the depth image and the depth background image.

In 1060, the first image set may be selected as the target image set, and the difference image unit 830 may obtain the ith difference image region based on the color image and the color background image.

In the process 1000, when the ratio of the number of valid pixels in the ith second image region to the number of pixels in the ith second image region is less than or equal the threshold $L_1$, the color image and the color background image may be used for generating the ith difference image region (or the ith filtered image), so as to avoid the error caused by using invalid depth value to generated the ith difference image region. When the ratio of the number of valid pixels in the ith second image region to the number of pixels in the ith second image region is more than the threshold $L_1$, the mean d of pixel values of the pixels in the ith second image region and the feature value T representing the richness of texture in the ith first image region may be computed. When the mean d is less than the threshold $L_2$ and the feature value T is more than the threshold $L_3$, the object in the shooting scene may be relatively close to the image capturing mechanism 110 and the texture in the ith first image region may be relatively rich. Such a situation may represent that the depth information in the depth image is reliable and accurate, therefore the depth image and the depth background image may be used for generating the ith difference image region to improve the performance of the background filtering. When the mean d is more than or equal to the threshold $L_2$, the object in the shooting scene may be relatively far to the image capturing mechanism 110. When the feature value T is less than or equal to the threshold $L_3$, the ith first image region may lack the texture information. The above situations may represent that the depth information in the depth image may not be reliable and accurate enough. Therefore the color image and the color background image may be used for generating the ith difference image region. The process 1000 may reduce the influence of the reflection of the object and the similar colors of the object and the background on the background filtering, so as to improve the background filtering performance.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit." "module." or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object to be recognized oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local part network (LAN) or a wide part network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system for image processing, comprising:
at least one storage medium including a set of instructions; and
at least one processor in communication with the at least one storage medium, wherein when executing the set of instructions, the at least one processor is directed to:
obtain a first image;
determine whether there is an object of interest in the first image by performing an object detection on the first image;
upon a determination that there is an object of interest in the first image:
obtain at least one reference image corresponding to the first image, the first image and the least one reference image respectively represent different aspects of substantially a same shooting scene;
retrieve at least one background image from a first storage device, the at least one background image including a first background image corresponding to the first image and a second background image corresponding to each of the at least one reference image; and
obtain a foreground image based at least in part on the first image, the at least one reference image, and the at least one background image.

2. The system of claim 1, wherein the at least one processor is directed further to:
upon the determination that there is an object of interest in the first image, reset a condition parameter.

3. The system of claim 1, wherein:
the first image is generated via a first sensor of an image capturing mechanism; and
one of the at least one reference image is generated via a second sensor of the image capturing mechanism, or be generated based at least in part on a second image generated by the second sensor.

4. The system of claim 1, wherein to obtain the foreground image based at least in part on the first image, the at least one reference image, and the at least one background image, the at least one processor is directed to:
obtain a difference image based on the first image, the at least one reference image, the first background image, and the at least one second background image, wherein the difference image includes one or more difference image regions, each of the one or more difference image regions represents a difference between a corresponding image region of the first image and a corresponding image region of the first background image, or a difference between a corresponding image region of one of the at least one reference image and a corresponding image region of the corresponding second background image;
for each pixel of the one or more difference image regions, determine whether the pixel is a foreground pixel or a background pixel based on one or more pixel values of the pixel and one or more corresponding thresholds;
generate the foreground image based at least in part on the foreground pixels of the one or more difference image regions.

5. The system of claim 4, wherein:
the first image includes one or more detection regions obtained by performing the object detection on the first image; and
the one or more difference image regions correspond to the one or more detection regions.

6. The system of claim 4, wherein to generate the foreground image based at least in part on the foreground pixels of the one or more difference image regions, the at least one processor is directed to:
for each of the one or more difference image regions:
when a number of the foreground pixels in the difference image region is more than a predetermined threshold, generate a corresponding portion of the foreground image using the foreground pixels in the difference image region; and
when a number of the foreground pixels in the difference image region is equal to or less than the predetermined threshold, determine that the difference image region includes no object of interest, and skip generating a corresponding portion of the foreground image using the foreground pixels in the difference image region.

7. The system of claim 6, the at least one processor is directed further to:
when each of the one or more difference image regions is determined as including no object of interest, trigger a determination whether a first predetermined condition is satisfied.

8. The system of claim 4, wherein:
the first image, the at least one reference image, and the at least one background image form a plurality of image sets; and
to obtain the one or more difference image regions, the at least one processor is directed to, for each of the one or more difference image regions:
select, from the plurality of image sets, a target image set; and
generate the difference image region based on the target image set.

9. The system of claim 8, wherein the at least one processor is directed further to, for each of the one or more difference image regions:
retrieve, from the first image, a first image region corresponding to the difference image region; and
retrieve, from each of the at least one reference image, a second image region corresponding to the difference image region, thereby obtaining at least one second image region, wherein the selecting, from the plurality of image sets, the target image set is based at least in part on one or more features of the first image region and the at least one second image region.

10. The system of claim 9, wherein to select, from the plurality of image sets, the target image set, the at least one processor is configured to:
determine whether a third predetermined condition is satisfied, wherein the third predetermined condition is correlated to the one or more features of the first image region and the at least one second image region; and
select the target image set based on a result of the determination.

11. The system of claim 9, wherein:
the first image is a color image;
the at least one reference image includes a depth image;
the at least one background image includes a color background image and a depth background image corresponding to the color image and the depth image respectively; and the third predetermined condition includes at least one of that:
a ratio of a number of valid pixels in the second image region of the depth image to a number of pixels in the second image region of the depth image is more than a first threshold;
a mean of pixel values of the pixels in the second image region of the depth image is more than a second threshold; or
a ratio of a number of pixels in the first image region of the color image whose gradient value is more than a third threshold to a number of pixels in the first image region of the color image is more than a fourth threshold.

12. The system of claim 11, wherein:
the color image and the color background image form a first image set;
the depth image and the depth background image form a second image set; and
to select the target image set based on the result of the determination, the at least one processor is directed to:
upon a determination that the third predetermined condition is satisfied, select the second image set as the target image set; and
upon a determination that the third predetermined condition is not satisfied, select the first image set as the target image set.

13. A method for image processing implemented on a computing device having at least one processor and at least one storage device, the method comprising:
obtaining a first image;
determining whether there is an object of interest in the first image by performing an object detection on the first image;
upon a determination that there is an object of interest in the first image:
obtaining at least one reference image corresponding to the first image, the first image and the least one reference image respectively represent different aspects of substantially a same shooting scene;
retrieving at least one background image from a first storage device, the at least one background image including a first background image corresponding to the first image and a second background image corresponding to each of the at least one reference image; and
obtaining a foreground image based at least in part on the first image, the at least one reference image, and the at least one background image.

14. The method of claim 13, wherein the obtaining the foreground image based at least in part on the first image, the at least one reference image, and the at least one background image comprises:
obtaining a difference image based on the first image, the at least one reference image, the first background image, and the at least one second background image, wherein the difference image includes one or more difference image regions, each of the one or more difference image regions represents a difference between a corresponding image region of the first image and a corresponding image region of the first background image, or a difference between a corresponding image region of one of the at least one reference image and a corresponding image region of the corresponding second background image;
for each pixel of the one or more difference image regions, determining whether the pixel is a foreground pixel or a background pixel based on one or more pixel values of the pixel and one or more corresponding thresholds;
generating the foreground image based at least in part on the foreground pixels of the one or more difference image regions.

15. The method of claim 13, wherein:
the first image includes one or more detection regions obtained by performing the object detection on the first image; and
the one or more difference image regions correspond to the one or more detection regions.

* * * * *